US006553847B2

(12) United States Patent
Garshelis

(10) Patent No.: US 6,553,847 B2
(45) Date of Patent: *Apr. 29, 2003

(54) COLLARLESS CIRCULARLY MAGNETIZED TORQUE TRANSDUCER AND METHOD FOR MEASURING TORQUE USING THE SAME

(75) Inventor: Ivan J. Garshelis, Pittsfield, MA (US)

(73) Assignee: Magna-Lastic Devices, Inc., Carthage, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/895,212

(22) Filed: Jul. 2, 2001

(65) Prior Publication Data

US 2001/0035056 A1 Nov. 1, 2001

Related U.S. Application Data

(63) Continuation of application No. 09/655,606, filed on Sep. 5, 2000, now Pat. No. 6,260,423, which is a continuation of application No. 09/175,546, filed on Oct. 20, 1998, now Pat. No. 6,145,387.
(60) Provisional application No. 60/064,831, filed on Oct. 21, 1997.

(51) Int. Cl.[7] .................................................. G01L 3/02
(52) U.S. Cl. .................................................. 73/862.336
(58) Field of Search ...................... 73/862.331, 862.332, 73/862.333, 862.334, 862.335, 862.336

(56) References Cited

U.S. PATENT DOCUMENTS

| 2,511,178 A | 6/1950 | Roters |
| 3,939,448 A | 2/1976 | Garshelis |
| 4,364,278 A | 12/1982 | Horter et al. |

(List continued on next page.)

FOREIGN PATENT DOCUMENTS

| DE | 1115051 | 10/1961 |
| DE | 3437379 | 4/1985 |
| EP | 0162957 | 12/1984 |
| EP | 0270122 | 6/1988 |
| EP | 0272122 | 6/1988 |
| EP | 0352187 | 1/1990 |
| EP | 0422702 | 4/1991 |

(List continued on next page.)

OTHER PUBLICATIONS

Garshelis, "A Study of the Inverse Wiedemann Effect on Circular Remanence," IEEE Trans. on Magn., MAG–10 No. 2 344–58 (1974).

(List continued on next page.)

Primary Examiner—Max Noori
(74) Attorney, Agent, or Firm—Blank Rome LLP

(57) ABSTRACT

A magnetoelastic torque sensor for providing an output signal indicative of the torque applied to a member, comprising, a first magnetoelstically active region in the member, the region being ferromagnetic, magnetostrictive magnetically polarized in a single circumferential direction and possessing sufficient magnetic anisotropy to return the magnetization in the region to the single circumferential direction when the applied torque is reduced to zero, whereby the ferromagnetic, magnetostrictive region produces a magnetic field varying with the torque. Magnetic field sensors are mounted proximate to the ferromagnetic, magnetostrictive region to sense the magnetic field at the sensors and provide the output signal in response thereto. The field arising from the magnetoelastically active region does not magnetize regions of the member proximate to the magnetoelastically active region to give rise to parasitic magnetic fields which are of sufficient strength to destroy the usefulness, for torque sensing purposes, of the net magnetic field seen by the magnetic field sensor means.

25 Claims, 8 Drawing Sheets

U.S. PATENT DOCUMENTS

| | | | |
|---|---|---|---|
| 4,523,482 A | 6/1985 | Barkhoudarian | |
| 4,627,298 A | 12/1986 | Sahashi et al. | |
| 4,760,745 A | 8/1988 | Garshelis | |
| 4,805,466 A | 2/1989 | Schiessle et al. | |
| 4,811,609 A | 3/1989 | Nishibe et al. | |
| 4,882,936 A | 11/1989 | Garshelis | |
| 4,891,992 A | 1/1990 | Kobayashi et al. | |
| 4,896,544 A | 1/1990 | Garshelis | |
| 4,899,598 A | 2/1990 | Gumaste et al. | |
| 5,052,232 A | 10/1991 | Garshelis | |
| 5,323,659 A | 6/1994 | Wakamiya et al. | |
| 5,351,555 A | 10/1994 | Garshelis | |
| 5,386,733 A | 2/1995 | Hesthamar et al. | |
| 5,465,627 A | 11/1995 | Garshelis | |
| 5,520,059 A | 5/1996 | Garshelis | |
| 5,591,925 A | 1/1997 | Garshelis | |
| 5,664,638 A * | 9/1997 | Padula | 180/443 |
| 5,706,572 A | 1/1998 | Garshelis | |
| 5,708,216 A | 1/1998 | Garshelis | |
| 6,047,605 A | 4/2000 | Garshelis | |
| 6,145,387 A | 11/2000 | Garshelis | |
| 6,220,105 B1 * | 4/2001 | Cripe | 73/862.69 |
| 6,260,423 B1 * | 7/2001 | Garshelis | 73/862.336 |

FOREIGN PATENT DOCUMENTS

| | | |
|---|---|---|
| GB | 2167565 | 5/1986 |
| JP | 59009528 | 1/1984 |
| JP | 59192930 | 11/1984 |
| JP | 359192930 | 11/1984 |
| JP | 1318933 | 12/1989 |
| JP | 5203508 | 8/1993 |
| WO | 9001781 | 2/1990 |

OTHER PUBLICATIONS

Garshelis, "The Wiedemann Effects and Applications," IEEE Applied Magnetics Conference, 75 CH0964–7 MAG, 38 pages (1975).

Garshelis, "Conditions for Stress Induced Bulk Moments," J. Appl. Phys. 50(3), 1680–2 (1979).

Garshelis, "A Versatile Magnetostrictive Displacement Transducer," IEEE Industrial Electronics Control Instrumentation Conference, 76 CH1 117–1 IECI, 99–105 (1976).

Y. Nonomura, E.A., "Measurements of Engine Torque with the Inter–Bearing Torque Sensor," SAE Technical Paper 1988, pp. 2.329–2.339.

G. Reiniger, "Halbleitersensoren Fur Massenmarkte," Elektrotechnik,Jan., 1985, Wurzburg DE, pp. 199–202.

Garshelis, Ivan J. and Christopher R. Conto, AA Torque Transducer Utilizing Two Oppositely Polarized Rings@ IEEE Transactions On Magnetics, vol. 30, No. 6, Nov., 1994, pp. 4629–4631.

Garshelis, Ivan J. et al., ADevelopment of Magnetoelastic Torque Transducer for Automotive Transmission Applications@ SAE Pape No. 9070605.

Garshelis, Ivan J. and C.R. Conto, AA Magnetoelastic Torque Transducer Utilizing a Ring Divided Into Two Oppositely Polarized Circumferential Regions@ J. Appl. Phys. 79 (8), Apr. 15, 1996, pp. 4756–4758.

Garshelis, Ivan J. et al., AA Single Transducer for Non–Contact Measurement of the Power, Torque and Speed of a Rotating Shaft@ SAE Technical Paper Series 950536, Feb. 27, 1995, pp. 57–65.

Garshelis, Ivan J., AInvestigations of Parameters Affecting the Performance of Polarized Ring Torque Transducers, IEEE Transactions on Magnetics, vol. 29, No. 6, Nov., 1993, pp. 3201–3203.

Garshelis, Ivan J. AA Torque Transducer Utilizing a Circularly Polarized Ring@ IEEE Transactions on Magnetics, vol. 28 No. 5, Sep., 1992, pp. 2202–2204.

Garshelis, Ivan J. et al., ADevelopment of a Non–Contact Torque Transducer for Electric Power Steering Systems@ SAE Technical Paper Series 920707, Feb. 24, 1992, pp. 173–182.

Garshelis, "A Study of the Inverse Wiedemann Effect on Circular Remanence," IEEE Trans. on Magn., MAG–10 No. 2 344–58 (1974).

Garshelis, "The Wiedemann Effects and Applications," IEEE Applied Magnetics Conference, 75 CHO964–7 MAG, 38 pages (1975).

Garshelis, "Conditions for Stress Induced Bulk Moments," J. Appl. Phys. 50(3), 1680–2 (1979).

Garshelis, "A Versatile Magnetostrictive Displacement Transducer," IEEE Industrial Electronics Control Instrumentation Conference, 76 CHI 117–1 IECI, 99–105 (1976).

Y. Nonomura, E.A., "Measurements of Engine Torque with the Inter–Bearing Torque Sensor," SAE Technical Paper 1988, pp. 2.329–2.339.

G. Reiniger, "Halbleitersensoren Fur Massenmarkte," Elektrotechnik, Jan., 1985, Wurzburg DE, pp. 199–202.

Patent Abstracts of Japan, vol. 8, No. 97 (P–272) (1534) May 8, 1984.

Garshelis, AA Non–contact Torque Sensor Using a Shape Memory Alloy@, 2244 Research Disclosure (1994) Mar., No. 359 Emsworth, GB.

* cited by examiner

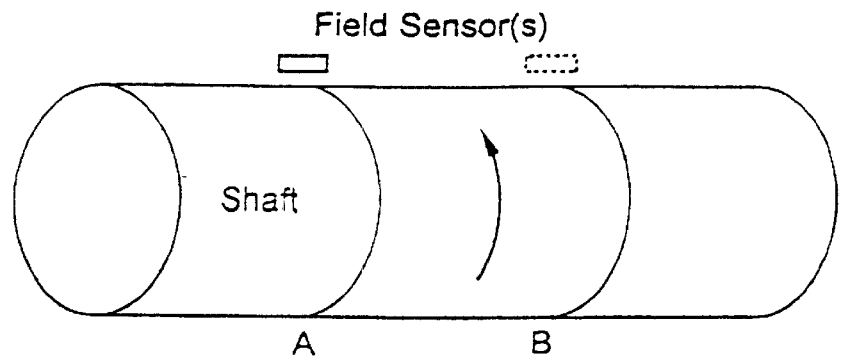
FIG. 1(d) Circumferentially Polarized Region
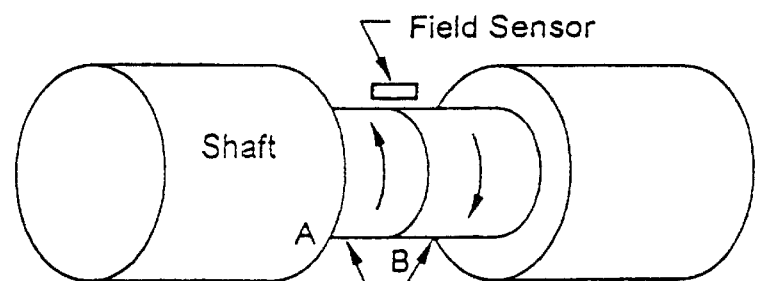
FIG. 1(e) Circumferentially Polarized Regions
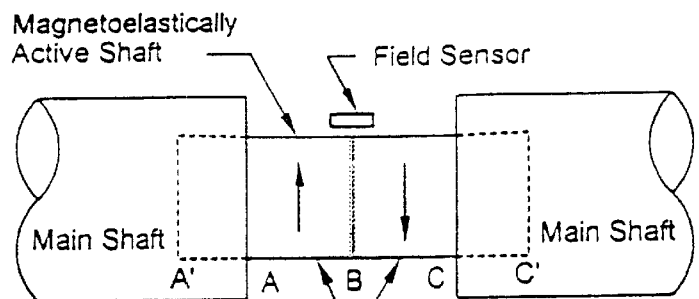
FIG. 1(f) Circumferentially Polarized Regions
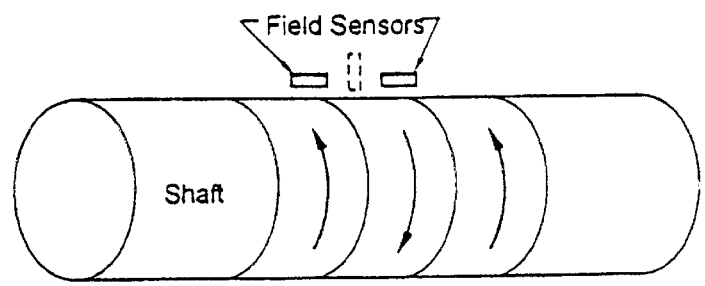
FIG. 1(g) Circumferentially Polarized Regions Typical M vs H Hysteresis Loop Minor MH Loop

COLLARLESS CIRCULARLY MAGNETIZED TORQUE TRANSDUCER AND METHOD FOR MEASURING TORQUE USING THE SAME

CROSS-REFERENCE TO RELATED APPLICATIONS

This application claims the priority of U.S. provisional application Ser. No. 60/064,831, filed Oct. 21, 1997 and is a continuation of U.S. patent application Ser. No. 09/655,606, filed Sep. 5, 2000, now U.S. Pat. No. 6,260,423 which was a continuation of U.S. patent application Ser. No. 09/175,546, filed Oct. 20, 1998, now U.S. Pat. No. 6,145,387.

FIELD OF THE INVENTION

The present invention relates to torque sensors and, more particularly. To non-contacting magnetoelastic torque sensors for providing a measure of the torque applied to a shaft.

BACKGROUND OF THE INVENTION

In the control of systems having rotating drive shafts, torque and speed are the fundamental parameters of interest. Therefore, the sensing and measurement of torque in an accurate, reliable and inexpensive manner has been a primary objective of workers for several decades.

Previously, torque measurement was accomplished using contact-type sensors directly attached to the shaft. One such sensor is a "strain gauge" type torque detection apparatus, in which one or more strain gauges are directly attached to the outer peripheral surface of the shaft and a change in resistance caused by strain is measured by a bridge circuit or other well known means. However, contact-type sensors are relatively unstable and of limited reliability due to the direct contact with the rotating shaft. In addition, they are very expensive and are thus commercially impractical for competitive use in many of the applications, such as automotive steering systems, for which torque sensors are now being sought.

Subsequently, non-contact torque sensors of the magnetostrictive type were developed for use with rotating shafts. For example, U.S. Pat. No. 4,896,544 to Garshelis discloses a sensor comprising a torque carrying member, with an appropriately ferromagnetic and magnetostrictive surface, two axially distinct circumferential bands within the member that are endowed with respectively symmetrical, helically directed residual stress induced magnetic anisotropy, and a magnetic discriminator device for detecting, without contacting the torqued member, differences in the response of the two bands to equal, axial magnetizing forces. Most typically, magnetization and sensing are accomplished by providing a pair of excitation or magnetizing coils overlying and surrounding the bands, with the coils connected in series and driven by alternating current. Torque is sensed using a pair of oppositely connected sensing coils for measuring a difference signal resulting from the fluxes of the two bands. Unfortunately, providing sufficient space for the requisite excitation and sensing coils on and around the device on which the sensor is used has created practical problems in applications where space is at a premium. Also, such sensors appear to be impractically expensive for use on highly cost-competitive devices, such as in automotive applications.

More recently, torque transducers based on measuring the field arising from the torque induced tilting of initially circumferential remanent magnetizations have been developed which, preferably, utilize a thin wall ring ("collar") serving as the field generating element. See, for example, U.S. Pat. Nos. 5,351,555 and 5,520,059 to Garshelis. Tensile "hoop" stress in the ring, associated with the means of its attachment to the shaft carrying the torque being measured establishes a dominant, circumferentially directed, uniaxial anisotropy. Upon the application of torsional stress to the shaft, the magnetization reorients and becomes increasingly helical as torsional stress increases. The helical magnetization resulting from torsion has both a circumferential component and an axial component, the magnitude of the axial component depending entirely on the torsion. One or more magnetic field vector sensors sense the magnitude and polarity of the field arising, as a result of the applied torque, in the space about the transducer and provides a signal output reflecting the magnitude of the torque. The stability of this transducer's "torque-to-field" transfer function under rigorous conditions of use reflects the efficacy of uniaxial anisotropy in stabilizing circular polarizations. This anisotropy, together with the spatially closed nature of the quiescent polarization, is also the basis of a striking immunity from polarization loss in relatively large fields. While the fields that arise from the ring itself have only hard axis components relative to the anisotropy, "parasitic" fields from permeable material that is close enough to become magnetized by the ring field have no such limitation. The addition of such parasitic fields to the torque dependent field from the ring can seriously degrade the near ideal features of the transfer function. As a result, in order to avoid a major source of such distortion, either the underlying shaft, or a sleeve that is placed between the shaft and the ring, is generally fabricated from a paramagnetic material. In addition, inasmuch as the peak allowable torque in a ring sensor is limited by slippage at the ring/shaft interface, concerns have been expressed regarding distortion arising from slippage at the ring/shaft interface under conditions of torque overload. This need for multiple parts of different materials, together with the requirement that the methods and details of their assembly establish both a rigid, slip-free mechanical unit and a desired magnetic anisotropy, have encouraged the investigation of alternative constructions.

SUMMARY OF THE INVENTION

Therefore, it is an object of the present invention to provide a magnetoelastic torque transducer in which the active, torque sensing region is formed directly on the shaft itself, rather than on a separate ferromagnetic element which then has to be affixed to the shaft.

It is another object of the invention to provide a magnetoelastic torque transducer in which the peak allowable torque is determined by the strength of the shaft material itself, rather than by slippage at an active element/shaft interface as in prior art sensors.

It is yet another object of the invention to provide a magnetoelastic torque transducer which depends upon the magnetocrystalline anisotropy of the shaft itself as the primary source of anisotropy for returning the magnetization to its previously established circumferential direction when the torque is reduced to zero, rather than upon techniques for instilling uniaxial magnetic anisotropy in the active, torque sensing region of a separate ferromagnetic element.

It is still another object of the invention to provide a collarless magnetoelastic torque transducer which depends for its operation on the sensing of a quantity that is inherently zero when the torque being measured is zero and which changes in both direction and magnitude in a correlative manner with the torque being measured.

It is yet another object of the invention to provide a magnetoelastic torque transducer which requires no external exciting field for its operation and which requires neither exciting currents nor coils.

A further object of the invention is to provide a magnetoelastic torque transducer including a unitary shaft of generally homogeneous chemical composition throughout comprising separate active and passive regions having magnetic properties appropriate for its respective function.

A still further object of the invention is to provide a non-contact method for measuring torque comprising the steps of providing a torqued member having a transducing region, magnetically polarizing the region in a single circumferential direction, the region possessing sufficient magnetic anisotropy to return the magnetization in the region, following the application of torque to the member, to the single circumferential direction when the applied torque is reduced to zero, whereby a transducing region field arises which varies in response to torque on the member, and measuring a component of field output of the transducer as an indication of torque on the torqued member, the torqued member being formed of a polycrystalline material wherein at least 50% of the distribution of local magnetizations lie within a 90° quadrant symmetrically disposed around the direction of circular remanence and having a coercivity sufficiently high that the transducing region field does not create parasitic magnetic fields in proximate regions of the member of sufficient strength to destroy the usefulness, for torque sensing purposes, of the net magnetic field seen by the field measuring apparatus.

Still another object of the invention is to provide a method for making a magnetoelastic torque transducer including a unitary shaft of generally homogeneous chemical composition throughout comprising separate active and passive regions having magnetic properties appropriate for its respective function by subjecting the appropriate regions of the shaft to thermal phase transformation processes, mechanical phase transformation processes, or combinations of thermal and mechanical phase transformation processes to obtain the respectively desired metallurgical phase in each such region in order to endow each such region with magnetic properties appropriate for its respective function.

These objects and others are achieved by providing a torque sensor comprising a magnetoelastically active region on a torqued shaft, and a magnetic field sensor, such as a Hall effect sensor, responsive to the transducing region field which arises as a result of the application of torque to the magnetoelastically active region. In the preferred embodiment, the magnetoelastically active region is polarized in a single circumferential direction and possesses sufficient magnetic anisotropy to return the magnetization in the region, following the application of torque to the member, to the single circumferential direction when the applied torque is reduced to zero, the torqued shaft being formed of a polycrystalline material wherein at least 50% of the distribution of local magnetizations lie within a 90° quadrant symmetrically disposed around the direction of magnetic polarization and having a coercivity sufficiently high that the transducing region field does not create parasitic magnetic fields in proximate regions of the shaft of sufficient strength to destroy the usefulness, for torque sensing purposes, of the net magnetic field seen by the magnetic field sensor. In particularly preferred embodiments the shaft is formed of a randomly oriented, polycrystalline material having cubic symmetry and the coercivity is greater than 15, desirably greater than 20 and, preferably, greater than 35.

In another embodiment of the invention these and other objects are achieved by providing a torque sensor including a unitary shaft of generally homogeneous chemical composition throughout comprising separate active and passive regions having magnetic properties appropriate for its respective function. Such a torque sensor is made by subjecting the appropriate regions of the shaft to thermal phase transformation processes, mechanical phase transformation processes, or combinations of thermal and mechanical phase transformation processes to obtain the respectively desired metallurgical phase in each such region in order to endow each such region with magnetic properties appropriate for its respective function.

BRIEF DESCRIPTION OF THE DRAWINGS

FIG. 1(d) shows the sensor of FIG. 1(a) including an active region AB having only a single direction of polarization.

FIG. 1(e) shows the sensor of FIG. 1(a) having a reduced diameter shaft portion on which the active region is formed.

FIG. 1(f) shows the sensor of FIG. 1(e) except that the reduced diameter active region is on a separate shaft.

FIG. 1(g) shows the sensor of FIG. 1(a) including an active region ABCD having three adjacent, oppositely polarized magnetically contiguous circumferential regions.

DETAILED DESCRIPTION OF THE PREFERRED EMBODIMENTS

Figure 1A:
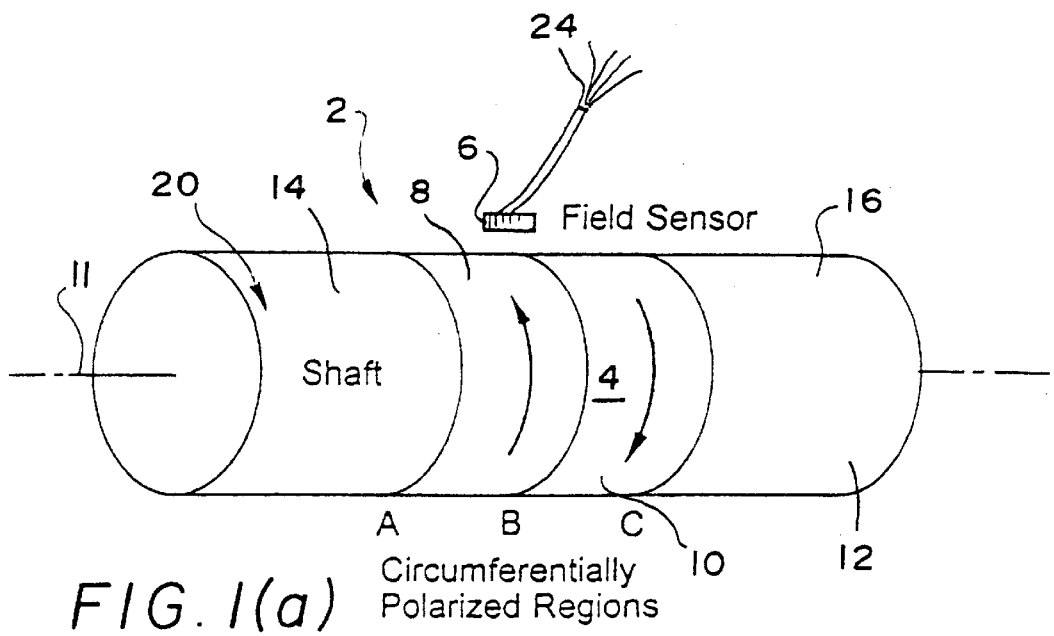
FIG. 1(a) is an assembly drawing showing the torque sensor of the present invention including an active region ABC having adjacent, oppositely polarized, magnetically contiguous circumferential regions formed on a solid shaft.

In the past few years an increased interest has developed in non-contact type, magnetoelastic torque sensor comprising a shaft, a magnetoelastically active element endowed with uniaxial magnetic anisotropy having the circumferential direction as the easy axis and magnetically polarized in a circumferential direction on the surface of the shaft and a magnetic field sensor for sensing the magnitude of the magnetic field arising as a result of the application of torque to the shaft. It has thus far been most desirable to utilize a physically separate part, e.g., a ring or "collar", to perform the active element function. In such a sensor, the uniaxial magnetic anisotropy is typically developed as a result of "hoop stress" arising from an interference fit between the shaft and the ring. In accordance with the present invention, it has been found that, in lieu of creating a ring/shaft interface, with its attendant problems, a polycrystalline shaft wherein a preponderance of the distribution of local magnetizations is confined to lie within a 90° quadrant symmetrically disposed around the direction of circular remanence will exhibit sufficient magnetic anisotropy in the circumferential direction to give rise to a sensible magnetic field upon the application of torque to the shaft. It, therefore, appears that by careful selection of a ferromagnetic shaft material an active region can be created directly on the shaft merely by appropriate circumferential polarization. It is clear, however, that adequately active regions cannot be created on just any ferromagnetic shaft. In this connection, the significant concerns are stability, linearity and hysteresis.

Stability, linearity and hysteresis are not fully independent characteristics of a torque transducer. For example, the presence of hysteresis is an obviously limiting factor on linearity. Moreover, since the presence of hysteresis signifies that irreversible magnetization altering processes are at work, the question of whether the transfer function associated with a novel torque excursion will be precisely repeated at the hundredth repetition of the same excursion is not known until tried. In general, the change from one stable hysteresis loop to another is progressive (a process called "reptation"). It is clearly desirable to avoid or at least minimize irreversible magnetization processes. Irreversible magnetization alteration occurs, for the most part, by either (or both) of two processes: domain wall motion and vector rotation from one easy axis to another. Since the anisotropies that are present in any practical material are sufficiently large, and since easy axes will have substantially larger angular separations than the tilt angles that occur with normally experienced torsional stresses (e.g., 90° compared to <10°), vector rotation does not appear to be a significant threat as a potential source of irreversibility in the transfer function although vector rotation between easy axes that are nearly equidistant from the circumferential direction may be operative during initial torque cycling. Thus if there is a significant amount of hysteresis or reptation in the transducer transfer function, the culprit will more likely be found to be domain wall motion.

The influence of domain wall motion on sensor operation and how to avoid its adverse effects will become apparent after identifying and examining those characteristics of a shaft that are active in the operation, and ultimately the performance, of a collarless torque sensor. These characteristics include size and shape features of the active and adjoining regions in addition to a variety of material properties. As will be seen, the performance of the torque sensor is dependent on interrelationships among several of these characteristics as well as on the magnitude of certain specific properties. The schematic illustration of the basic construction of a collarless torque sensor shown in FIG. 1(a), together with the description which follows should help make this clear.

Referring first to FIG. 1(a), a torque sensor according to the present invention is shown generally at 2. Torque sensor 2 comprises transducer 4 and magnetic field vector sensor 6. Transducer 4 comprises one or more axially distinct, magnetically contiguous, oppositely polarized circumferential bands or regions 8, 10 solely defining the active or transducer region of the shaft 12. Region 14 of the shaft to the left of A and region 16 to the right of B are distinguishable from the active region only by the absence of any significant remanent magnetization. Shaft 12 is typically formed of a ferromagnetic, magnetostrictive material having a particularly desirable crystalline structure, as will be discussed more fully hereinafter, such that the active region will, likewise, be formed of ferromagnetic, magnetostrictive material having the desired crystalline structure. Torque 20 is applied at one portion of shaft 12 and is transmitted thereby to another portion of the shaft where the motion of shaft 12 due to torque 20 performs some useful work. Torque 20 is shown as being in a clockwise direction looking at the visible end of shaft 12, but obviously can be applied to rotate or tend to rotate the shaft in either or both directions depending on the nature of the machine incorporating shaft 12.

Transducer 4 is magnetically polarized in a substantially purely circumferential direction, as taught in U.S. Pat. Nos. 5,351,555 and 5,520,059, the disclosures of which are incorporated herein by reference, at least to the extent that, in the absence of torque 20 (in a quiescent state), it has no net magnetization component in the direction of axis 11 and has no net radial magnetization components. The closed cylindrical shape of transducer 4 enhances the stability of the polarization by providing a complete circuit.

As will be seen, due to the construction, material selection and processing of transducer 4, application of torsional stress to shaft 12 causes reorientation of the polarized magnetization in transducer 4. The polarized magnetization becomes increasingly helical as torsional stress increases. The helicity of the magnetization in transducer 4 depends on the magnitude of the transmitted torque 20 and the chirality is dependent on the directionality of the transmitted torque and the magnetoelastic characteristics of transducer 4. The helical magnetization resulting from torsion of transducer 4 has both a circumferential component and an axial component along axis 11. Of particular importance is that the magnitude of the axial component depends entirely on the torsion in transducer 4.

Magnetic field vector sensor 6 is a magnetic field vector sensing device located and oriented relative to transducer 4 so as to sense the magnitude and polarity of the field arising in the space about transducer 4 as a result of the reorientation of the polarized magnetization from the quiescent circumferential direction to a more or less steep helical direction. Magnetic field vector sensor 6 provides a signal output reflecting the magnitude of torque 20. In a preferred embodiment, magnetic field vector sensor 6 is an integrated circuit Hall effect sensor. Wires 24 connect magnetic field vector sensor 6 to a source of direct current power, and transmit the signal output of magnetic field vector sensor 6 to a receiving device (not shown), such as a control or monitoring circuit for the machine or system incorporating shaft 12. A more detailed discussion of the types, characteristics, positioning and functioning of magnetic field vector sensors appears in U.S. Pat. No. 5,351,555 at columns 6–9 and U.S. Pat. No. 5,520,059 at columns 7–11 and 25, the disclosures of which are incorporated herein by reference.

The two circumferentially polarized regions 8,10 together constitute the transducer's active region 4. The field sensor shown is centered on the "wall" between the two oppositely polarized regions and is oriented to sense the radial field at this location. One or more magnetic field sensors may be utilized. In general, each such sensor would be located near the active region and oriented such that it is maximally efficient at sensing the field that arises when the shaft is transmitting torque. The similarity between this transducer and the more conventional design of U.S. Pat. Nos. 5,351, 555 and 5,520,059 employing an active region endowed with uniaxial circumferential anisotropy ("ring sensor") is obvious. Some of the differences are equally obvious, others are more subtle:

1. The active region in this basic collarless design is defined solely by the existence of the remanent magnetizations indicated. Portions of the shaft to the left of A and to the right of B are distinguishable from the portion between A and B only by the absence (in such portions) of any appreciable remanent magnetizations. Thus, except for secondary reasons associated with other shaft functions, or to visually identify the active region, or to optimize some feature of the transducer performance, neither the chemical composition, metallurgical condition, diameter, surface treatment or finish of the shaft between A and C is different from portions to the left of A or to the right of C. While the dual active region, i.e., two magnetically contiguous, oppositely polarized circumferential rings, is the preferred arrangement in connection with the present invention (as compared to a single polarized region as in U.S. Pat. No. 5,351,555), the reasons for the preference have more to do with obtaining the sharply defined magnetization gradient at B (hence a strong divergence when these magnetizations are tilted under torsion) than to avoid the ambiguous effects of ambient axial fields at the less sharply defined borders between circularly magnetized and non-remanently magnetized regions at A and C. In this connection, note that if A and C represent the ends of an active region having a single direction of circular remanence, the axial component when tilted by an axial field, is more or less matched by the axial component that develops within the unpolarized regions to the left of A and to the right of C. Thus, unless the active region is near an end of the shaft, axial fields cause little divergence in the axial magnetization, hence little "signal" field. Torsional stress on the other hand, while also causing the circular remanence to develop an axial component, does not alter the axial component of magnetization within the non-magnetized regions of the shaft. Hence, there is a divergence of this component and an external field thereby arises. This divergence is reduced from that which occurs at B in the dual region configuration, not only because the polarity of the remanence reverses at B, but because the polarizing process results in a more diffuse gradient in remanence at A and C. In this connection, it may in fact be desirable to deliberately diffuse the "edges" of the circular remanence at A and C in order to reduce the field intensity in these regions thereby reducing the effects of these fields on nearby shaft material.

2. Since the active (field generating) region is an integral part of a homogeneous shaft, the shaft material must be ferromagnetic. The higher the saturation magnetization the greater the potential for generating a torque dependent magnetic field. Plain and low alloy carbon steels have saturation magnetizations in the same range as elemental iron (4 $pM_s$=21,600 Gauss=2.16 Tesla). Alloying usually reduces $M_s$ about in proportion to the percentage of non-ferromagnetic alloying elements. Nickel in small quantities has little effect, cobalt raises $M_s$. Some high strength steels are highly alloyed, having combined non-iron constituents as high as 30%. Nevertheless any of the ferromagnetic steels that might be used for shafts will undoubtedly have $M_s$ within 20% of that of iron. Hence the actual value of $M_s$ of the specific shaft material has limited independent impact on the performance of the torque transducer.

3. The active region, hence the shaft itself must be magnetostrictive. The product of magnetostriction l and the torsional principal stress s provides the magnetoelastic anisotropic influence that is fundamental to the operation of the transducer. As in the torque sensor of U.S. Pat. No. 5,351,555, it is this anisotropy that biases the easy axis in one axial direction or the other, thereby creating the magnetization divergence that is the source of the signal field. The individual crystallites that make up the polycrystalline materials from which the shafts are fabricated rarely have isotropic magnetostrictions. In iron, l is particularly anisotropic, even to the extent that it varies in sign according to the direction in which the crystal is magnetized. For example, when an ideally demagnetized single crystal of iron is magnetized parallel to a cube edge, its length in that direction increases 20 ppm; when magnetized parallel to a cube diagonal, it decreases its length in that direction by 21 ppm. In the language of magneticians, $l_{100}$=20 ppm and $l_{111}$=−21 ppm. Small percentages (>>3%) of some alloying elements, e.g., Ni and Si, reduce the absolute value of $l_{111}$ resulting in a more isotropic magnetostriction.) There are two points to be remembered here. Firstly, it should be realized that there are no domain walls in the remanent condition, or, if any 90° walls have formed as a result of internal fields, that they are effectively pinned. Secondly, since the quiescent magnetization is along easy axes (e.g., in <100> directions in typical steel shafts), it must be rotated away from these easy axes by the magnetoelastic anisotropy ls. It is, in the interest of a linear transfer function, desirable for the magnetoelastic energy to stay in direct proportion to the torque (i.e., to s). Hence, it is desirable for l to stay constant as the magnetization vectors are rotated away from the quiescent easy axes by ls. In some crystals, depending on their orientation, rotation towards the +_direction will bring the vector closer to the <111> direction, hence, if $l_{111}$ is negative, there will, between the <100> and the <111> directions, be a compensation point where ls=0 for any value of s. In pure iron and steels with very low alloy content, even <110> is negative so it is not possible with these materials to avoid this undesirable condition for any crystal orientation. This is why Ni and Si are desirable alloying elements.

4. The active region, hence the shaft itself must possess some source of anisotropy to return the magnetization to the established (during the polarization process) circumferential direction when the torque is reduced to zero. To ensure a symmetrical response to CW and CCW torques, the distribution of this quiescent anisotropy should be symmetrical about the circumferential direction. To ensure that the magnetoelastic anisotropy associated with the torque causes all of the remanently magnetized portions of the shaft to contribute cooperatively in the development of an axial component, the quiescent anisotropy should nowhere depart more than 45° from the circumferential direction. Stated otherwise, the need for anisotropy is an expression of the need to confine the circular remanence within the circumferentially oriented 90° quadrant. Satisfactory performance is obtainable if at least 50% of the local magnetizations lie within the 90° quadrant which is symmetrically disposed around the direction of the circular remanence. If the quiescent anisotropy has as its principal source the magnetocrystalline anisotropy associated with the atomic arrangements of a latticed structure possessing multiaxial symmetry, e.g., a randomly oriented polycrystalline material wherein each crystallite has cubic symmetry (including distorted cubic, e.g., tetragonal) with <100> or <111> easy axes, the quiescent circumferential remanence in more than 50% of the crystallites will automatically meet this "45°" requirement. The magnetocrystalline anisotropy in iron and all common steels have such cubic symmetry and thus (based solely on this requirement) are all candidate materials for collarless torque transducers. The magnitude of the anisotropy of pure iron is generally reduced by common alloying elements, although tungsten and, to a lesser extent, manganese cause it to rise. Molybdenum, vanadium and tin cause relatively small downward changes, while chromium is slightly less sluggish in causing the anisotropy to decrease from that of pure Fe. Sufficient quantities of Ni, Co, Si or Al can drive the anisotropy to zero (and below). In collarless torque transducers we are concerned about the absolute magnitude of the crystal (short for magnetocrystalline) anisotropy being too low, since this is the "spring" that returns the magnetization to its quiescent circumferential direction when the torque is removed. Thus, for example, if the crystal anisotropy ($K_I$) is smaller than $ls_r$, where $s_r$ is the magnitude of residual stresses associated with prior processing of the shaft, then $K_I$ is no longer the principal anisotropy and more than 50% of the quiescent remanence may no longer meet the 45° distribution requirement. Here is the first glimpse of the importance of interrelationships between the several material properties that are individually important to the operation of the transducer. While $K_I$ and l are compositionally dependent (intrinsic) properties, $s_r$ and other structure dependent properties (e.g., textures, chemical or structural ordering) act in concert with the intrinsic properties to determine the magnitude, orientation and symmetry of quiescent anisotropies. Also, while small amounts of Ni or Si effectively raise l, they also tend to reduce $K_I$. Thus in selecting the appropriate alloy for the shaft, we have to carefully moderate alloy content.

Figure 2A:
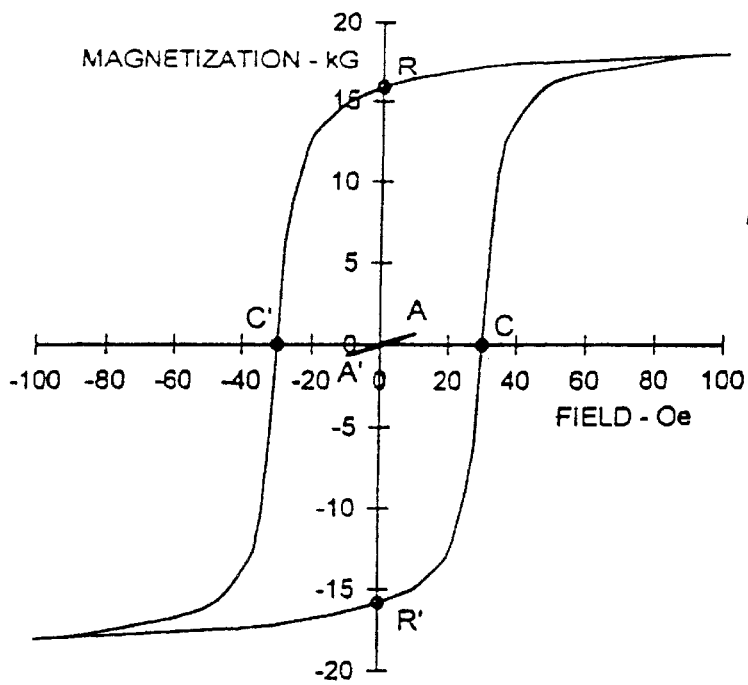
FIG. 2(a) is a graphical illustration of a typical "major" hysteresis loop.

5. While it should, by now, be recognized that in the present invention the shaft itself must be ferromagnetic, magnetostrictive and provide the necessary magnitude and orientation distribution of magnetic anisotropy, the response of the shaft magnetization to magnetic fields has not, thus far, been considered. Ferromagnetic materials are readily characterized by the magnitude of the magnetization changes induced by magnetic fields and the magnitude of the fields required to induce significant magnetization changes. Since these characteristics are not single valued functions of one variable, they are conveniently described by a plot of magnetization M vs field H as H is cyclically varied over a symmetrical bipolar range. The salient features of such a major hysteresis loop are indicated in FIG. 2(a), discussed more fully hereinafter, wherein the various slopes and intercepts are variable from one material to another, the slopes represent local susceptibilities, the intercepts on the y axis are the remanent magnetization and on the x axis, the coercive force.

The changing slopes over the various portions of the hysteresis loop reflect the different processes involved in the magnetization changes that take place in fields of different intensities. Our concern for these details is not merely academic since, in the operation of the collarless torque transducer, magnetic fields arise from the active region and these fields pervade not only the space in which the field sensor(s) is located but also the space occupied by the shaft itself. The magnetization changes caused to take place within non-active portions of the shaft results in other fields arising and these (parasitic) fields also pervade the regions of space where our field sensor(s) are located. Thus, in the interest of not corrupting the transfer function of the active region, it is important that the parasitic fields be very small, ideally zero, in comparison with the active region field or, if of significant intensity, that they change linearly and anhysteretically (or not at all) with applied torque, and that they be stable with time and under any of the operational and environmental conditions that the shaft might be subjected to. Stated otherwise, any parasitic fields which arise must be sufficiently small compared to the active region field that the net field seen by the magnetic field sensors is useful for torque sensing purposes. Since the parasitic fields have as a source the magnetization within the non-active portions of the shaft, it is clearly desirable for such magnetization to be kept small, or if of significant magnitude, that it changes little under the action of the fields generated by the active region (and other ambient or accidentally imposed fields). Small magnetizations can be assured if $M_s$ is small or if the susceptibility (c=DM/DH), or its close relative, permeability (m=c+1) is small. It is clearly not possible (in this basic collarless design) for $M_s$ to be small since a large $M_s$ is preferred for the active region. Thus, in order to minimize the corrupting influence of parasitic fields, it is important to utilize a shaft material having small_in any value of field to which it might be exposed. The value of_depends on whether the magnetization change is primarily due to vector rotation or motion of domain walls. Vector rotation is resisted by the anisotropy, whereas domain wall motion is resisted by heterogeneity. Coercivity provides a measure of the difficulty experienced by the field in altering the magnetization. The coercive field $H_c$ is defined as the field intensity required to reduce the remanent magnetization (the magnetization that remains after having been exposed to a saturating field) to zero. Thus at $H_c$, 50% of the magnetization has been reversed. If the magnetization reversal is taking place solely by vector rotation, $H_c$ (for such processes $H_c$ is also called the critical field), in materials composed of randomly oriented crystallites having cubic symmetry with $K_I>0$, is equal to $2K_I/M_s$. For iron, with $K_I$=450,000 ergs/cm$^3$ and 4_$M_s$=21,600 Gauss, $H_c$ for vector rotation is 524 Oe. Measured values of $H_c$ for plain carbon and low alloy steels are typically in the range of 5 to 50 Oe (even lower for annealed iron) depending on the alloy content and thermal or mechanical treatments. Thus it is clear that the principal process by which magnetization is altered in these materials is not vector rotation but, rather, is domain wall motion. It is also clear that a material having $H_c$=50 Oe is better for use in a collarless torque sensor than one in which $H_c$=5 Oe. Correspondingly, still higher values of $H_c$, e.g. 524 Oe, would still be better. In any one steel, $H_c$ may be increased by a factor of 5 or more by cold work or by heat treatment. $H_c$ is generally higher when in the mechanically hardest (strongest) condition. This follows from the fact that strength reflects the presence of impediments to the flow (glide) of one layer of atoms over another within the crystal (dislocations, voids, inclusions, precipitates, lattice distortions due to interstitial atoms, stress, etc.) and $H_c$ reflects the pinning effect on domain walls of these same inhomogeneities in the crystal structure.

The contradictory, often opposite, effects of the various material and magnetic parameters, as illustrated by the foregoing, present a dilemma in the design of collarless torque transducers. In the interest of having the torque develop magnetic fields of sufficient amplitude to be readily sensed by economical field sensing devices, and to be substantially larger than usually encountered ambient fields, it is desirable that the active region produce fields as large as possible (favor high $1/K_f$, high $M_s$). Yet if these fields are of sufficient intensity to cause significant changes in the magnetization within the active region, the transfer function will not be stable at high torque levels (favor high $K_f/1$, low $M_s$). If these fields are of sufficient intensity in portions of the shaft that are proximate to the active region, the resulting parasitic fields can corrupt the transfer function of the transducer in ways (hysteresis, instability and non-linearity) that diminish or destroy the usefulness of the device (favor low $M_s$, 1 and c, high $H_c$ and $K_f$). The problems can be immediately alleviated if domain walls can be pinned sufficiently securely to raise the actual $H_c$ closer to the limit established by the anisotropy. While primarily a materials problem, the selection of a shaft material, the processes used to fabricate the shaft and its subsequent thermal and mechanical treatments are usually made to best fulfill the primary shaft function, i.e., the transmission of torque, with little concern for whether these factors satisfy the preferences for torque sensing.

It should be emphasized that all of the foregoing discussion pertains to the basic or simplest collarless design illustrated in FIG. 1(a). As will become clear from a consideration of other embodiments of the present invention, to be described hereinafter, there is nothing in the concept of a collarless design that forbids alteration of the active region (or of the non-active portions of the shaft) in such a manner as to obtain better combinations of the significant properties than exist in other portions of the shaft. Thus, it is not essential to the concept of a collarless transducer that the presence of a remanent magnetization be the sole characteristic that distinguishes the active region from adjoining regions of the shaft. Various local treatments and other modifications are described in U.S. Pat. No. 5,391,555, columns 4–15, and are incorporated herein by reference.

Other variations from the basic collarless design would seem, on the basis of our present understanding, to lead to performance improvement. For example, with reference to FIG. 1(c), if the shaft were increased in diameter over a limited axial extent, that was then circumferentially magnetized (i.e., the active region is on a shoulder), the intensity of the signal field in the (now not so) proximate portions of the shaft would be reduced even if the active region produced the same field per unit torque as the single diameter basic design of FIG. 1(a). Moreover, the field sensor(s) would now be further from the source of parasitic fields.

As previously mentioned, it may prove beneficial to "taper" the circumferential magnetization, thereby diffusing the A and C edges of the active region shown in FIG. 1(a). The purpose here is to reduce parasitic fields from the inactive portions of the shaft, both by reducing the intensity of the signal field in these portions (which reduces the magnetization of these portions) and by reducing the intensity of the torque dependent fields which would arise from these portions when magnetized by the signal field. This approach may be readily implemented by tapering the proximity to the active region or strength of the magnets used to create the polarizations which form the active region.

Figure 1B:
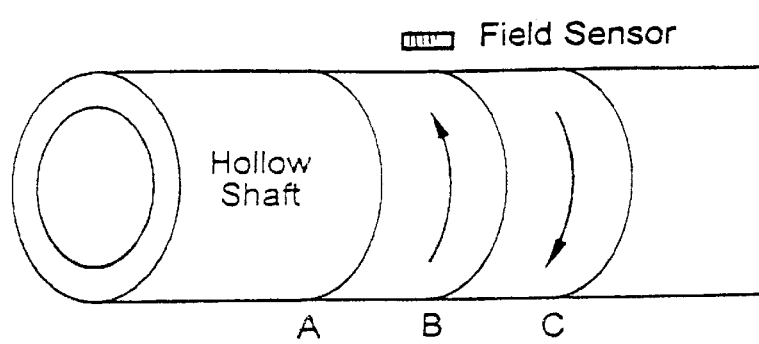
FIG. 1(b) shows the sensor of FIG. 1(a) utilizing a hollow rather than a solid shaft.
Figure 1C:
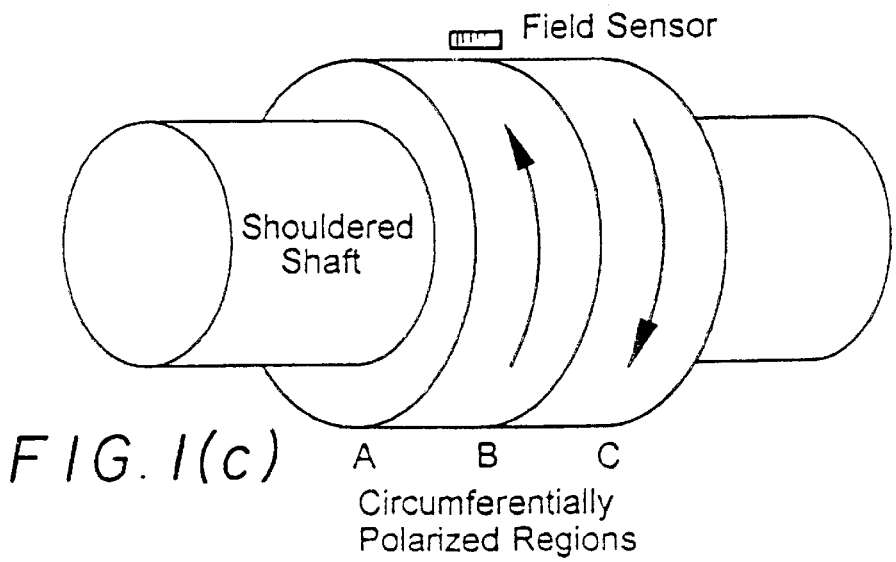
FIG. 1(c) shows the sensor of FIG. 1(a) having an increased diameter shaft portion on which the active region is formed.

Hollow, through hardened shafts, such as in FIG. 1(b), would appear to be better than solid or case hardened shafts for several reasons. A hollow shaft is more uniformly stressed by torsion than a solid shaft, thus all of the cross section can contribute to the signal field. Creating a circular remanence throughout a solid shaft is not possible. Even approximating this in a large diameter shaft becomes impractically difficult. Even if circular magnetization were attainable, the central regions of the shaft would contribute little to the signal field since they are so lightly stressed. Moreover these central regions become "proximate permeable material" and might well be a source of parasitic fields, thereby diminishing rather than contributing to the performance of the torque transducer. This potentially negative property of solid shafts would, in general, be exacerbated since, even in through hardened shafts (wherein the hardness results from quenching), the central regions are generally not as hard as the surface regions and thus will have a lower $H_c$. For these reasons through hardening would appear to be more desirable than case hardening. On the other hand, surface hardening by nitriding might be beneficial since it can further raise the hardness of some steels thereby probably also raising $H_c$. Cryogenic treatments are also known to substantially increase the hardness of commonly used (case hardened) shaft materials (e.g., from Rockwell 60 to 64 for 8620 and from R55 to R 62 for 4320). Such treatments may also raise $H_c$.

FIG. 1(d) illustrates the same sensor as in FIG 1(a) except that the active region is polarized in only a single direction. This construction is suitable for solid or hollow shafts but not good for shouldered shafts since the end regions (A and B) would develop poles in an axial magnetic field. It has been found that the placement of a second sensor at the right end of the active region (shown in phantom) helps reduce sensitivity to ambient fields in the diametral direction.

FIG. 1(e) illustrates the same sensor as in FIG. 1(a) except that the diameter of the shaft in the active region is reduced from that of the main shaft. In this configuration, the magnetic "poles" that form at A and C when the shaft is carrying torque are less effective in magnetizing the larger volume of material in the adjoining regions. This will reduce the intensity of the parasitic fields contributed by these regions. This construction also allows the field sensor(s) to be located radially inward from the surfaces of the larger diameter sections, to locations where the intensity of the parasitic fields is reduced. As with the shouldered design of FIG. 1(d), this construction is not suitable for use with a single polarized region.

FIG. 1(f) illustrates the same sensor as in FIG. 1(e) except that the active region is now formed on a separate shaft. While shown as having a reduced diameter over its entire length, the section of this magnetoelastically active shaft between A and C may in fact have the same or a larger diameter than the Main Shaft sections to which it is attached (which need not have the same diameter at each end). The active shaft may be rigidly attached to the Main Shafts by interference fits, pinning, welding, screw threads or the like. The Main Shafts are preferably made of non-ferromagnetic material, e.g., stainless steel, aluminum brass, fiberglass, plastic, etc., but may also be made of low permeability ferromagnetic material, preferably having a low magnetostriction, e.g., hardened, plain carbon steel, and are incapable of creating significant parasitic fields. The active shaft may be hollow or solid and is circumferentially polarized only between AB and BC. Since the AA' and BB' regions also carry smaller percentages of the torque, their contributions to parasitic fields is minimal. Also those portions of the active shaft not in the active region are not readily accessible to local sources of possibly disturbing fields such as magnetized tools (screw drivers, wrenches, etc.).

FIG. 1(g) illustrates the same sensor as in FIG. 1(a) except with three (3) circumferentially polarized regions and 2 large divergence "domain walls" (at B and C). The increased field intensity therebetween also enables the use of a single axially oriented field sensor (shown in phantom) in lieu of two field sensors, one at each domain wall.

FIG. 2(a) illustrates the shape and salient features of a typical "major" hysteresis loop, i.e., one wherein the limiting fields are sufficient for the magnetization to show signs of approaching saturation. This is evidenced by the flattening of the loop extrema and the narrowing of the difference in magnetizations between ascending and descending "limbs" of the loop. Hysteresis loops effectively represent dynamic phenomena; they are traversed in a counterclockwise direction—up and to the right, down and to the left, etc. For the major loop shown here it should be apparent that further increases in the field beyond _100 Oe will not raise the peak magnetizations significantly above ±18 kG. When the field is reduced to zero after having reached these "technical saturation" values, the magnetization "falls back" to a value indicated as R (or R' for fields of the opposite polarity). R and R' represent the "remanent" magnetization. The value of R in the loop shown is 15.8 kG. The "remanence ratio," i.e., the ratio of the remanent magnetization to the peak magnetization, for this loop is (15.8/18)=0.878. In a material having uniaxial anisotropy in the field direction, the remanence ratio would be equal to 1.00, its highest possible value. If the field direction is normal to the anisotropy in such a material, the remanence ratio would be zero, its lowest possible value. In a material having a random orientation of cubic crystallites with easy axes along the cube edges, this ratio would be 0.8312. If the easy axes were along cube diagonals, the remanence ratio would be 0.866. The relatively high remanence ratio of the loop shown in FIG. 2(a) indicates that the crystallites are either not randomly oriented or that some other anisotropic influence is also present. In either case, hysteresis loops for other field directions would generally exhibit larger or smaller (different) remanence ratios.

The value of the field where the magnetization is reduced to zero (points C and C'), is the "coercive field". The coercive field generally increases with increasing peak field excursions, reaching a maximum value (called the "coercive force") at saturation. The coercive field in the loop shown is 30 Oe, a value only minimally smaller than the coercive force of the hypothetical material exhibiting the indicated loop. If the magnetization reversal between R and C' was by coherent rotation (in each domain) of the local moments against a crystal anisotropy of 400,000 ergs/cm$^3$ (a typical value for low alloy steels), the coercive force would be 2×400,000/(18,000/4p) 559 Oe, nearly 19 times the observed value. Thus, if the loop shown is for a material of this type (e.g., low alloy steel), magnetization reversal clearly occurs primarily by domain wall displacement rather than by coherent rotation.

Figure 2B:
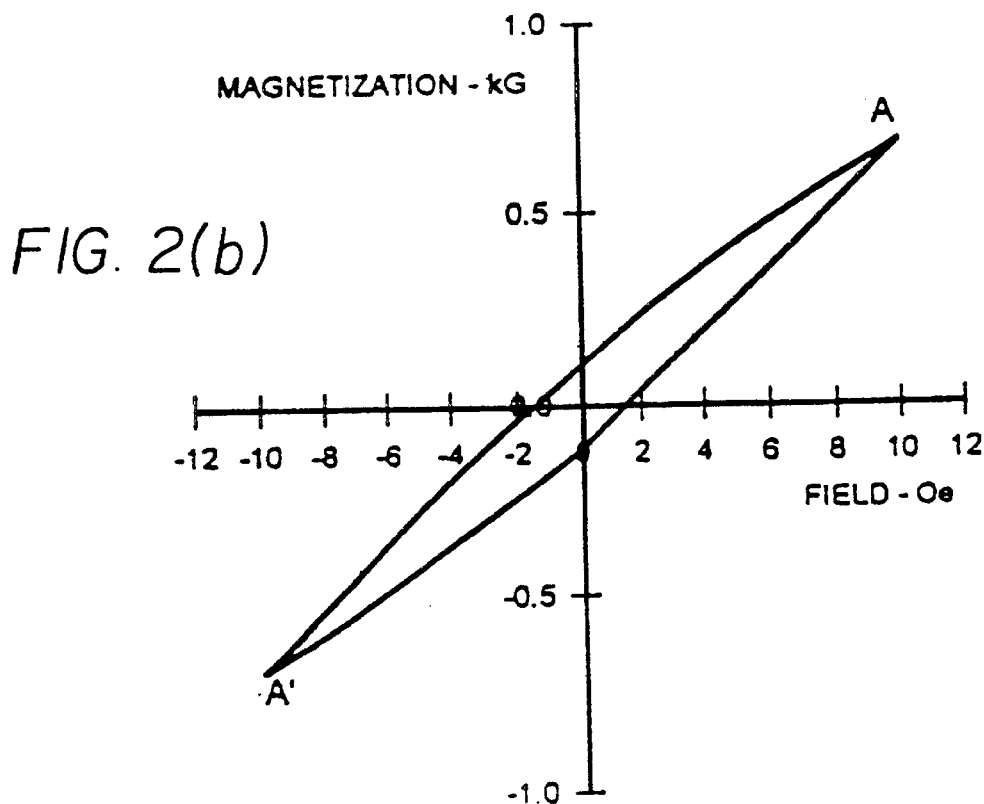
FIG. 2(b) is a graphical illustration of a typical "minor" hysteresis loop.

A and A' in FIG. 2(a) indicate the extrema of a "minor" hysteresis loop, i.e., one in which the peak field excursions are significantly less than the coercive force. An enlarged view of this minor loop is shown in FIG. 2(b). While both the remanence and coercive field of this loop are seen to be quite small, they are not zero. Hence, even for small excursions of an applied field, the resulting magnetization alterations are seen to include some irreversibility. The smaller the field excursion of a minor loop, relative to the coercive force, the smaller are these irreversible features. For very small (relative) field excursions the "loop" narrows to a straight line through AA'. In any case the slope of the straight line through AA' of minor loops is known as the reversible susceptibility ($c_{rev}$). In a magnetized specimen, the value of $c_{rev}$ changes little (perhaps over a range of ±15%) at any point on the major loop within the coercive field. While minor loops for uniaxial material exhibit neither remanence nor coercivity they generally exhibit a finite $c_{rev}$ in fields normal to the anisotropy and zero $c_{rev}$ (for perfectly uniform and coherent anisotropy) in fields parallel to the anisotropy axis.

The fact that most materials exhibit finite $c_{rev}$, remanence and coercivity, even in small fields, is clearly pertinent to the operation of collarless torque transducers. By virtue of their finite $c_{rev}$, regions of the shaft that are exposed to the fields which are generated by the active region when torque is applied to the shaft develop a magnetization. Within the active region itself, these fields are called "demagnetizing" fields since they act in a direction tending to oppose the tilting of the quiescent circular magnetization. Since such fields can never be stronger than their causative agents, their action is simply to reduce the effect of torque, i.e., they reduce the potential sensitivity of the transducer. By virtue of the finite remanence and coercivity of the shaft material, the reactive magnetization in the non-active regions varies in an hysteretic fashion with the applied torque. Since the causative fields also fall off with distance from the active region, these reactive magnetizations are not uniform. Neither are they circumferentially directed. Moreover, since the shaft material is magnetostrictive, the magnetization within the reactively magnetized regions will vary with the applied torque. As a result, these previously passive, newly magnetized regions themselves contribute field components in the space within and around the shaft. The net field seen by the field sensors (i.e., the signal field) is thus the resultant of the purposeful field from the active region and the parasitic fields from the reactive regions. Not surprisingly, the desirably linear and non-hysteretic transfer function of the transducer can be corrupted by the inevitable presence, in collarless designs, of proximate magnetizable material. The desirability of keeping coercivity high should now be clear.

Operation of the transducer requires that the shaft "surface" be remanently magnetized in a circumferential direction. Material that is not circumferentially magnetized can become reactively magnetized and thus become a source of parasitic fields. Although deeper, in terms of depth of magnetization, appears, therefore, to be better, two factors mitigate the need for circumferentially magnetizing the entire shaft cross section. Firstly, the reduction in torsional shear stress with increasing distance from the surface reduces the relative potential contribution to the signal field from the more central regions of the shaft cross section. Secondly, even if these deeper regions developed useful field intensities at their location, their contribution to the field intensity at the field sensor location (some distance radially outward from the shaft surface) would be substantially reduced. These same factors reduce the capability of deeply interior, non-circumferentially magnetized regions to produce significantly troublesome parasitic fields at "distant" field sensors. The first factor limits the depth of circumferential magnetization required in small shafts to perhaps 50% of the radius. The second factor indicates that even in very large shafts, circumferential magnetization deeper than 10–20 mm would provide little benefit. In many hollow shafts, penetrations to such depths would reach to the inside surface. This would be a desirable condition for hollow shafts, especially for thin wall hollow shafts, since they are made hollow in order to more efficiently use the available material strength and to reduce weight. If all of the shaft cross section is transmitting useful torque, it would make sense to have all of the cross section contribute to signal field rather than have some of it detract from the signal field and then contribute to the parasitic fields. As a practical matter, however, it is extremely difficult to magnetize to a depth greater than about 1–2 mm, even on large diameter shafts, because it is difficult to generate a strong enough magnetic field so far from the magnetic field source.

Figure 3A:
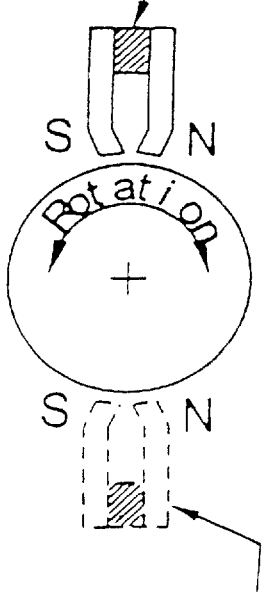
FIG. 3 illustrates front and side elevational views of a typical arrangement of a shaft and polarizing magnets for simultaneously creating two polarized regions.
Figure 3B:
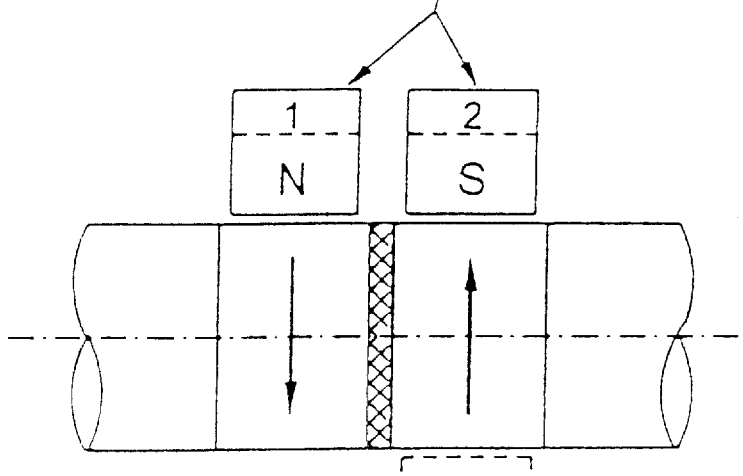

Considering the available means for creating circumferential magnetization, the non-necessity of polarizing the entire cross section is fortuitous. Methods and procedures for polarizing are described in U.S. Pat. No. 5,351,555, columns 13–14 and U.S. Pat. No. 5,520,059, columns 15–16 and 26–28 as well as in J. Appl. Phys. 79 (8), 4756, 1996, the disclosures of which are incorporated herein by reference. Creating the active region in collarless torque transducers requires two additional considerations. Firstly since the active region is generally of limited axial extent and is to be located at some desirable axial position along the shaft, methods involving the conduction of electrical currents through the entire shaft or through coaxial conductors passing through hollow shafts are unsuitable. While various configurations for passing electrical currents through limited and well defined axial lengths are possible, these would have restricted applicability and offer no recognizable advantage. Polarization by rotation through the strong gradient field of proximate, permanent or electromagnets is the greatly preferred method since the same polarizing equipment and process can be used for a wide range of shaft diameters and materials. The axial length of the active region and its axial location can, by this method, be precisely controlled. Secondly, the polarization of collarless torque transducers will require much stronger magnetizing fields than the polarization of conventional "ring on shaft" designs. This follows directly from comparisons of the major hysteresis loops of materials that are respectively suited for each design and from considering that the penetration of the magnetizing field in collarless designs will in general be greater than thin ring designs for the same size shaft and that interior regions of the shafts used in collarless designs inherently have higher permeabilities than the shafts used with ring designs. Proximate permeable material tends to "short circuit" the flux from the polarizing magnets, thereby diminishing the effectively available field intensity. However stated, the result is the same—permeable material between the source magnet and the target shields the target from the field of the magnet. In this case the surface regions shield the interior regions thereby limiting polarization depth. As shown in IEEE Trans. Mag 28 (5), 2202, 1992 (FIG. 5) and in FIG. 5 of the above referenced J. Appl. Phys. paper, major loops of rings under hoop stress are square (uniaxial anisotropy) and typically show coercive fields of just a few Oersteds. On the other hand, major loops of collarless torque transducer shaft materials will show more rounded features (random cubic anisotropy) and exhibit coercivities greater than about 15 Oersteds. Coercivities of 35 or more would be preferred. Since it is the reverse field "lobes" of the field from the magnetizing magnet that do the polarizing and since the intensity of these lobes is only about 20% of the direct field lobe, and also since "technical saturation" (required to maximize the remanence) requires fields of at least 2 times the coercive force of the shaft material, and, finally, since a large coercive force is better to minimize parasitic fields and maximize stability, the need for strong polarizing magnets for collarless designs is clear. With hollow shafts of large enough diameter, it might be advantageous, in regard to obtaining a uniform, full depth polarization of the active region, to employ cooperating internal and external polarizing magnets. A typical arrangement of shaft and polarizing magnets is illustrated in FIG. 3 which shows an arrangement of polarizing magnets and shaft for simultaneously creating two (2) magnetically contiguous polarized regions, as in the collarless design illustrated in FIG. 1(a). The number of sources of polarizing fields will in general be the same as the number of polarized regions being created.

In the simplest embodiment, the polarizing magnets would consist typically of high energy (e.g., samarium-cobalt or neodymium-iron-boron) permanent magnets held close to the shaft surface while the shaft is rotated on its axis in either direction. With shafts of higher coercivity, soft magnetic "pole pieces" may desirably be fitted to each permanent magnet and be appropriately shaped and spaced to most efficiently utilize the available magnet mmf (to drive magnetic flux through the shaft). FIG. 3 shows two such polarizing magnets, "1" and "2", having respectively opposite polarities and axially spaced apart some small distance. The bold arrows on the shaft indicate the directions of the resulting circumferential remanent magnetizations, i.e., the polarized regions, which together constitute the active region of the transducer. The lines normal to the shaft axis are the projections of the borders of these polarized regions. It is to be noted that the width (the axial extent) of these regions exceeds somewhat the width of the polarizing magnets. The shaded portion between the two oppositely polarized regions represents a sub-region within which the remanent magnetization undergoes a transition from one circular direction to the other. The width of this transition region can be made as large as one pleases merely by increasing the separation of the two polarizing magnets. While the width of the transition zone can be decreased by decreasing this separation distance, there is a minimum separating distance beyond which the transition zone will get no smaller. It should be apparent that as magnets 1 and 2 get closer to each other, their respective fields each weaken the other. When they become close enough to touch, there are no longer North and South poles at their interface, hence there will be some distance along the magnets themselves before there will be adequate field intensity in the circumferential direction to polarize the shaft. The minimum width of this transition region is dependent on the effective strength of the polarizing magnets and the coercive force of the shaft material, decreasing with increases in the former and increasing with increases in the latter. The optimum width of the transition zone will depend on the type, size and orientation of the field sensor(s) used to detect the torque dependent field. In the event that it is desired to obtain a transition zone that is narrower than can be obtained with polarizing magnets 1 and 2 when in their side by side positions, angular displacement about the shaft axis, of one magnet relative to the other, will provide the separation needed to reduce their mutually weakening interaction. In FIG. 3, the extreme separation of 180° is illustrated for convenience. Instead of magnet 2 being alongside magnet 1, it is now rotated to the position illustrated in phantom and indicated as magnet 2'. It might also be possible to magnetize one region at a time, i.e., rotate the shaft with only magnet 1 in place, then, remove magnet 1 and rotate the shaft with magnet 2 in place. In all schemes using permanent magnets, the magnets will need to be moved away from their positions close to the shaft (alternatively, a "keeper" may be slid between the poles of each) before shaft rotation ceases. Electromagnets may be advantageously used for polarizing since their "strength" is adjustable and they may be effectively "shut off" without physical movement of either magnets or keepers.

Figure 4:
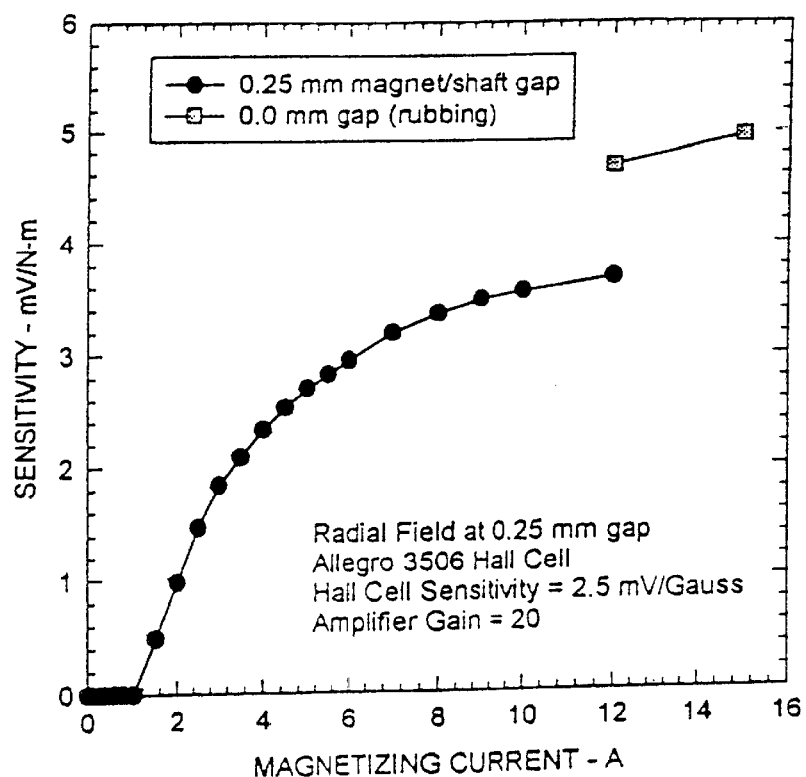
FIG. 4 is a graphical representation of the relationship between the strength of the polarizing magnets and the sensitivity of the resulting sensor.

An example of the dependence of torque transducer performance (as measured by sensitivity, i.e., field per unit torque) on the "strength" of the polarizing magnets (as measured by the magnetomotive force (mmf) and magnetic circuit reluctance) is indicated in FIG. 4. Immediately apparent in this Figure is the complete absence of a torque dependent field for magnetizing currents below about 1.5 A. This demonstrates the need for the effective field to reach some critical intensity before the shaft material develops any significant circumferential remanence. This critical intensity is related to the coercive force of the shaft material since the intensity of the reverse field lobes must approach the coercivity of the shaft material, in this case 44 Oe, in order to develop significant remanence. Stated otherwise, the field must get intense enough for large scale "depinning" of the domain walls. As the magnetizing current is increased above the threshold value (in this instance above 1.5 A), the sensitivity is seen to grow continuously. While the growth in sensitivity with increasing current is rapid at first, it soon diminishes, showing signs of eventually reaching a maximum value. Examination of the two data points at 12 and 15 A with zero spacing between the magnets and the shaft, shows that the anticipated saturation of the sensitivity attainable with the 0.25 mm gap is more an artifact of the apparatus than of the true saturation of the shaft remanence. These two data points illustrate both the difficulty in reaching a saturated value of sensitivity and the importance of minimizing reluctance in the magnetizing circuit. The transfer function depicted here is the combined result of the following interactive properties and phenomena:
1. the growth in coercive field with peak magnetization;
2. the coercive force of the shaft material;
3. the radially inward penetration of the critical field amplitude with mmf;
4. the diminishing shear stress with distance from the surface;
5. the diminishing axial magnetization with distance from the surface;
6. the diminishing field per unit torque from these inner regions;
7. the growing distance of the field sensor from ever more inward field sources;
8. the reduction in transition zone width with increasing polarizing field intensity;
9. the non-linearity (saturation) of the polarizing field with increasing current.

Once an active region is created by local circumferential polarization(s), the shaft may be properly characterized as a torque transducer. The active region will preferably be comprised of dual polarizations. While in usual embodiments, the tilting of the remanent magnetization that results from the application of torque is sensed by a proximate device that is responsive to the intensity of some component of the magnetic field resulting from such magnetization tilt, changes in the axial component of the remanent magnetization associated with such tilting can also be sensed by the voltage (emf) induced in a coil encircling the shaft and centered over a circumferentially polarized region. The axial component of magnetization (proportional to the torque) can be recovered by integrating the induced emf with time. In the present state of electronic technology no completely driftless integrating means exist, although low drift over the short term—in the order of several seconds to several minutes—is achievable. Nevertheless, in applications where the torque of interest only exists for short periods, e.g., in pulse and impulse tools, this is a viable sensing arrangement, especially in constructions having just a single polarization in the active region.

Figure 5:
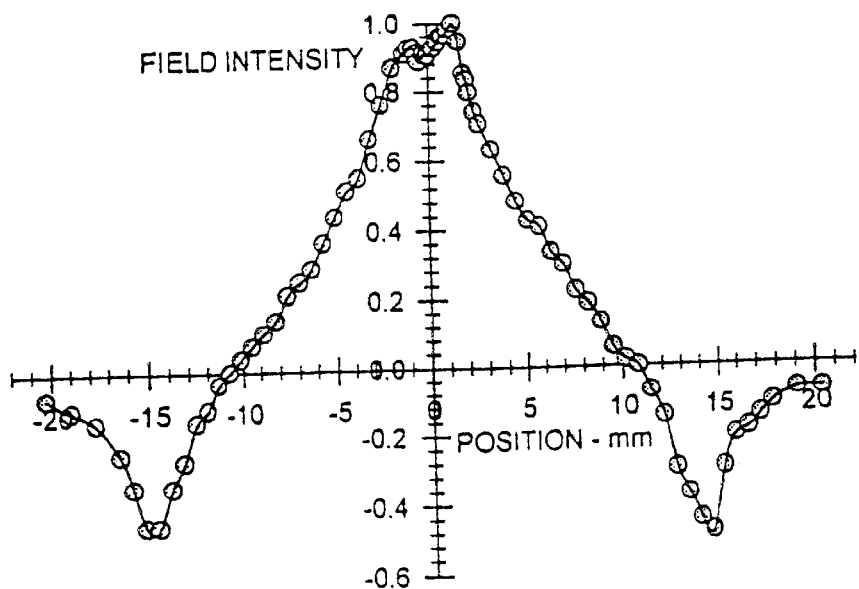
FIG. 5 is a graphical representation of the relationship between the relative radial magnetic field intensity arising as a result of the application of torque and the axial position along the active region of the shaft.

FIG. 5 illustrates the manner in which the relative radial field intensity (arising with the application of torque) varies with axial position along the active region of a polarized shaft with polarization at the highest attainable sensitivity shown in FIG. 4. The general shape of this field distribution is consistent with the approximately quadripolar field expected from two adjacent regions having oppositely directed axial magnetizations. For example, this is the shape of the field distribution that would be seen in the space around two coaxial bar magnets placed with like poles abutting. Detailed examination of this Figure shows features that reflect both the physical arrangement of the polarizing apparatus and the magnetic properties of the shaft material. For example, it will be observed that the central peak is in reality two peaks with a small valley in-between. This is the kind of field distribution that one would expect from the two bar magnets if their like poles are somewhat separated. It is, therefore, a clear indication of the presence of a transition zone having a significant width. The inequality of the height of the two peaks probably represents slight differences in the two polarizing magnets. As was seen in FIG. 4, small changes in the distance between the magnet pole pieces and the shaft can significantly affect the sensitivity. A small non-parallelism between the magnet surfaces and the shaft would prevent both of the magnets used to obtain this data from being at precisely the same distance from the shaft or having the full width of each actually rubbing against the shaft. Since the width of the space between the magnets used to obtain this data was 2.5 mm, about the same as the axial separation of the peaks, the relative width of the transition zone and magnet separation indicated in FIG. 3 (wherein the transition zone is narrower than the magnet separation) is clearly not a general result. From what has already been stated it should be obvious that the transition zone can be wider than this spacing. On the other hand, when it is noticed that the distance between the smaller (reverse polarity) peaks at just under ±15 mm overhangs the overall magnet dimension of 27.5 mm, it should be apparent that for widely separated magnets (wherein the polarized region will overhang the magnet width at both ends), the transition zone may well be narrower than the magnet spacing.) With this understanding of the polarizing process, the contribution of item 8, above, to the observed slow approach to a saturated value of sensitivity may now be appreciated. A field sensor located at the geometric center of the space between the magnets will indicate an increase in sensitivity as the depth of the valley between the peaks decreases.

The dual peaks and imperfect symmetry of the curve shown in FIG. 5 represent just one experimental result. In some applications it may be desirable to have a single sharp central peak, while in other applications, a broad, relatively flat central peak would be more desirable (for example to reduce the variation in sensitivity to axial "play" in the shaft). In general, and also to simplify explanations of the device, a symmetrical curve with a single central peak would be preferable. On the other hand, there may be specific applications where two, several or many, single polarized regions might advantageously be distributed along a shaft. In effect such a shaft would contain more than one active region, having for various special purposes, either the same or oppositely directed circumferential polarizations. The distinguishing characteristic of such multiple region arrangements is that the fields that arise from each such region are, in proximate space, independent of each other. A plot such as that shown in FIG. 5 would then show symmetrical positive and negative peaks (of equal amplitude) at or near the ends of each polarized region. It should be clear that, in transducers having more than one polarized region, it is transition zone width that establishes the difference in characterization of the active regions as single multiple, or multiple single, polarized regions.

A related issue that needs to be briefly addressed is the influence of the axial extent of the active region on the torque transducer performance. The dimensions of the active region require consideration from two concerns. First, of course, is the question of how much space is available on the shaft for implementation of the torque sensing function. If, in a specific application, this space is severely limited, either by virtue of the proximity of non-related magnetizable material, e.g., ball bearings, gears, etc., this becomes the overriding consideration. If as much space as desired is available, the dimensions of the active region will generally be chosen to attain some desired sensitivity (i.e., signal field per unit torque). The goal here is not simply to maximize the field intensity at the peak value of applied torque but rather it is to attain a field intensity that is congruous with the preferred type and orientation of magnetic field (or axial magnetization component) sensor(s). Too high a signal field can not only saturate some types of field sensors, but may also magnetize nearby ferromagnetic material in machine parts serving functions unrelated to torque sensing. Since the signal field intensity is the product of a demagnetizing factor (which decreases with length of active region) and the axial component of magnetization (which increases with length of active region), the length of the active region is not a sensitive determinant of field intensity. Thus, if a whole family of torque transducers having widely varying torque ranges (i.e., of various shaft diameters) is to be constructed, it may well be advantageous to use an active region having the same dimensions for all in order to allow the same field sensor design to be employed with all. In terms of shaft diameter, a useful range of dimensions may be some integral multiple, e.g., four (4) times the diameter for small shafts in the 3 mm diameter range, to one (1) times the diameter for shafts in the 20 mm diameter range, to 0.3 times the diameter for shafts in the 100 mm diameter range. It is probably a useful estimate to consider that the length of the active region will be between 5 and 100 mm for shafts between 1 and 1000 mm in diameter. The axial extent of the active region is determined, for the most part, by practical considerations such as the region must be long enough to develop a practically useful field and appropriately sized so as to be sensed by commercially available, practically useful magnetic vector sensors. In the event that the effective ends of such regions are deliberately made to be diffuse, the "dimensions" of the active region become even less of an issue. Design expediency is the major consideration in determining the dimensions and axial location(s) of the active region(s). In general, it will be preferable to locate active regions on areas of the shaft that are sufficiently distant from its ends to be unaffected by magnetizations arising from ambient, incidental or accidental magnetic field sources.

As already indicated it is necessary for the shaft to have an appropriate combination of mechanical, magnetic and magnetoelastic properties in order that it can function as a useful collarless torque transducer. Suitable combinations of properties are found in many commonly available steels. Several "permanent magnet" alloys that also posses adequate combinations of strength and ductility are also suitable, although their limited commercial availability and relatively high cost will restrict their use to special applications. Obtaining the required combination of mechanical and magnetic properties is as much a function of metallurgical condition as it is of chemical composition; hence the chosen shaft material will almost certainly be subjected to some form of heat (and/or mechanical) treatment. This will often consist of heating to an appropriate temperature and cooling at a controlled rate (e.g., air, oil or water quenching) followed by a reheating to a lower temperature and more slowly cooled (tempering—also "aging" to precipitate intermetallic compounds). Cryogenic processes may be found appropriate to optimize and/or stabilize the obtained properties. In any case, the goal of all such treatments is to simultaneously strengthen the material mechanically (raise its yield strength) and "harden" it magnetically (raise its coercive force). In general it will be found that the material in its final condition should have a coercive force ($H_c$) preferably higher than 15 Oe, more desirably higher than 20 Oe, preferably higher than 35 Oe and, ideally, higher (when measured in the direction of that field) than the largest magnetic field intensity that will arise with the application of the maximum expected torque.

Examples of the categories of materials that have been found suitable for collarless torque transducers are shown below. Typical grades in each category are indicated.

1. Martensitic Stainless Steels (preferably air hardened)

AISI/SAE Grades: 403, 410, 414, 416, 420, 431, 440A, 440B, 440C

2. Precipitation Hardening Stainless Steels (chromium and nickel)

AISI/SAE Grades: 15-5PH, 17-4PH, 17-7PH, PH 13-8Mo

3. Alloy Steels (quenched and tempered—sometimes carburized or nitrided)

AISI/SAE Grades: 4140, 4320, 4330, 4340, 4820, 9310

Typical Designations: 300M, Aermet 100, 98BV40, 9-4-20, 9-4-30

4. Tool Steels (preferably quenched and tempered, metallurgically "clean" high alloy steels)

AISI Grades: Types A, D, H, L, M, O, T, W and high cobalt high speed tool steels 5. Maraging Steels (high nickel, low carbon)

Typical Designations: 18 Ni 250, C-250, Vascomax T-300, NiMark, Marvac 736

6. Ductile Permanent Magnet Materials

Typical Designations: Vicalloy, Remendur, Cunife, Cunico, Vacozet

7. Magnet Steels

Typical Designations: KS Steel, MT Steel, 3.6% Cr, 15% Co, Tungsten Steel

8. Specialized Alloys and Other Materials

Figure 6:
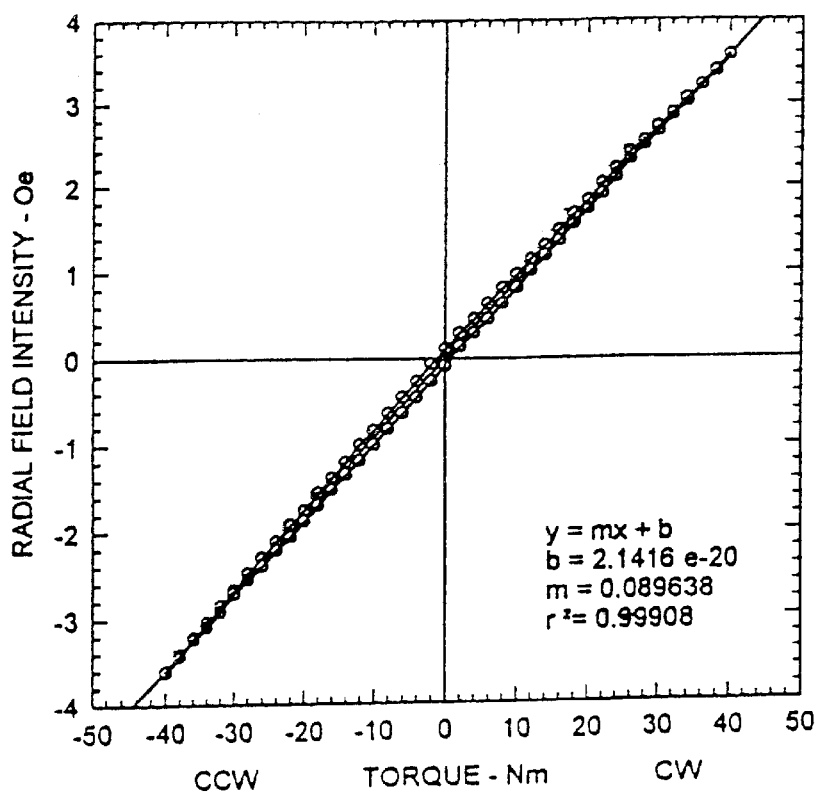
FIG. 6 is a graphical representation of the transfer function of a collarless torque sensor made from High Speed Steel material showing the relationship between applied torque and radial field intensity.

Typical Designations: Permendur, Alfer, Alfenol, Kovar, Hard Drawn Nickel, Hard Drawn Permalloy The presently attainable performance of collarless torque transducers falls short of that obtainable with ring on shaft constructions. Hysteresis in the transfer function is the primary source of imperfect performance. Nevertheless, presently attainable performance is completely satisfactory for many applications. Moreover, since a wide range of hysteresis has been observed (different materials, varying heat treatments), including both positive and negative values, it is clear that performance will be improved with further development. The transfer function of an experimental collarless torque transducer made from the same type and size of High Speed Steel material as was used to obtain the data shown in FIGS. 4 and 5 is shown in FIG. 6. Other than for the obvious presence of hysteresis, the transfer function of this transducer is seen to exhibit excellent linearity. No significant changes were seen in the regression line when the loading was increased to ±50 N×m. The transfer function from other experimental transducers (generally made from materials having lower coercivities) showed both higher values of hysteresis and signs of saturation (diminishing slopes at the highest torque levels).

It has been made clear throughout the description of the present invention that it is desirable to avoid entirely or at least minimize the presence of permeable magnetizable material near the active region of the transducer. In the ring on shaft sensors of U.S. Pat. No. 5,351,555, this is usually accomplished by using shafts of low permeability material or by spatial separation, e.g., by means of an intervening low permeability sleeve, of the "ring" from a shaft that has a higher than desired permeability. With collarless designs, the desired low permeability of proximate material is realized by using shaft materials having relatively high coercivities, sometimes together with geometric isolation of the active region from adjoining shaft portions. The essential feature of successful collarless constructions is that the magnitude of the field created by the torque is too small to cause significant irreversible magnetization changes in regions of the shaft proximate to the active region.

One further practical requirement of circularly magnetized torque transducers is that the one or more active region(s) each have identifiable locations on the shaft as well as effective axial extents that are shorter than the end to end length of the shaft. In the ring on shaft sensors of U.S. Pat. No. 5,351,555, the physical dimensions of the ring limit the axial extent of the active region and, since the active region(s) are obviously limited to lie within the ring dimensions, their position on the shaft is automatically established by the ring location. In collarless designs, both the axial extent and the axial location of the active region(s) are established as details of the instilled circumferential remanent magnetizations, with or without cooperative geometric features.

Figure 7:
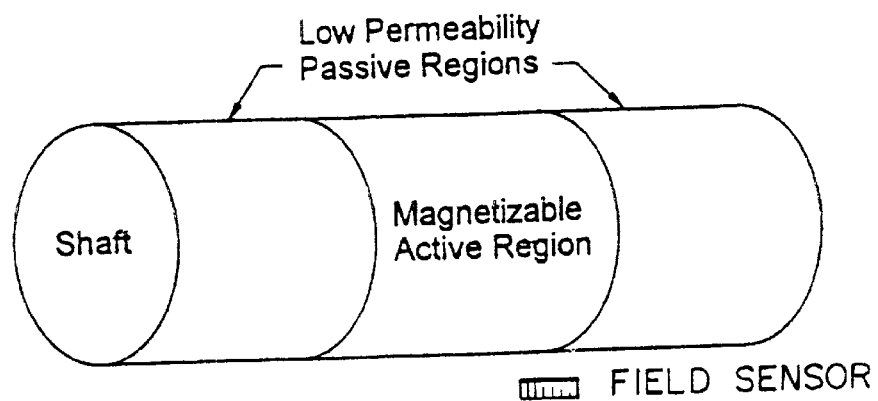
FIG. 7 is an assembly drawing of a torque sensor of the present invention showing, on the shaft, a central active region formed of a ferromagnetic, magnetostrictive material and passive regions formed of a low permeability material.

There is yet another construction for collarless torque sensors which substantially avoids the development of parasitic fields in shaft material proximate to the active region. According to this construction, the presence of magnetizable material near the active region(s) is avoided and fixed active region size(s) and location(s) are established by utilizing the unique properties of certain selected shaft materials. Suitable materials will be capable of existing in either of two (or more) different, stable (over the required operating temperature range of the transducer) metallurgical phases. One such phase will be sufficiently ferromagnetic and magnetostrictive to fulfill active region requirements and another will have sufficiently low permeability to be effectively non-magnetizable, hence to fulfill substantially passive region requirements. The term "substantially passive" as used herein means regions which, when subjected to magnetic fields, do not become sufficiently magnetized so as to give rise to parasitic magnetic fields which are of sufficient strength to destroy the usefulness, for torque sensing purposes, of the net magnetic field seen by the magnetic field sensors. If these phases can be established at will by appropriate processing, it should be clear that both active and substantially passive regions, each of desired size and location, can be made to coexist on the same shaft. A torque transducer is then created simply by instilling a circumferential remanent magnetization (i.e., by polarizing) appropriate portions of the active region(s) in the desired circular sense(s). It is, of course, desirable that the anisotropy that maintains these polarizations limit the remanent magnetization to lie within 45° of the circumferential direction. Uniaxial anisotropy, such as is instilled in the rings of ring on shaft sensors, in this direction is obviously most desirable. Also desirable is the magnetocrystalline anisotropy associated with the atomic arrangements of a latticed structure possessing multiaxial symmetry, e.g., a cubic structure having bcc crystal structure, which characterizes the shaft materials selected for collarless sensor constructions. Notwithstanding that the active region will, desirably, be flanked by substantially passive regions, it is important for the coercivity of the active region to remain high. This is to prevent the field arising as a result of the applied torque from causing irreversible loss of the magnitude of circumferential polarization in the active region. As with the previously described embodiment of the present invention, a coercivity greater than 15 is desirable, greater than 20 is particularly desirable and greater than 35 is preferred. The basic construction of a shaft metallurgically processed for use as a torque transducer is shown in connection with the sensor of FIG. 7 which illustrates a single piece shaft processed to have an isolated ferromagnetic, magnetostrictive region (the Magnetizable Active Region) of desired axial dimension and position. Though physically of one piece, and generally of homogeneous chemical composition throughout, the shaft is comprised of separate active and substantially passive regions each having magnetic properties appropriate for its respective function.

Many solid materials can exist in more than one structural form, a characteristic called polymorphism. Each distinct polymorphic (or allotropic) form constitutes a phase. Transformation from one phase to another is a common occurrence in metallic materials. Phase changes at characteristic temperatures during either cooling or heating are found to occur in many pure metals and also in alloys. The critical temperature range during which a phase transformation takes place varies with metal composition, from temperatures near the melting point to temperatures near absolute zero. Some phase transformations occur isothermally over a period of time, although the precise final phase will more often depend on the rate of cooling (or of heating) through a critical temperature range. In some alloys, a phase transformation which would normally occur during cooling, can also be induced by mechanical means to occur at temperatures far above that required by cooling alone. Efficacious processes include plastic deformation, shock waves and sometimes even simple hydrostatic pressure. Transformations that will not occur at all during cooling, even to temperatures near absolute zero, often can be made to occur at higher temperatures by such mechanical means. The extent of the transformation that can be induced by such cold work varies with composition, degree of deformation and with rate of deformation. Thermally induced phase transformations of a material that has been cold worked often occur at different temperatures than for non deformed material of the same composition. In many iron rich (ferrous) alloys, the various phases which are stable over the operating temperature range of most machinery (from −50° C. to +150° C.) include a full spectrum of magnetic characterizations. Thus, a single alloy can stably exist in a phase which is ferromagnetic, paramagnetic (or even antiferromagnetic) depending on its history of thermal and mechanical treatment. It is even possible for distinct coexisting ferromagnetic phases to differ significantly in their respective magnetic and magnetoelastic properties. The different phases of any one material most often also have different densities, electrical resistivities, elastic moduli and other physical properties.

Regardless of the specific alloy used and whether the phase transformations are to be induced solely by thermal processes, solely by mechanical processes, or by combinations of both thermal and mechanical processes, the general method of processing a shaft will involve subjecting the active and substantially passive regions to the different processing conditions required to obtain the respectively desired phase in each such region. Thus, at least one of the processing steps will be localized to one but not the other of these shaft regions.

Subjecting a local region to some types of mechanical deformation is readily accomplished. For some processes such as forging, swaging, knurling, surface rolling and the like, the location on the shaft and the axial extent of the processed region is readily controlled by the size and position of the associated tooling. Localized shock waves are readily initiated by wrapping the desired region(s) of the shaft with suitable explosives. Even axial tension or compression can be localized by means of appropriate clamping devices.

Figure 8:
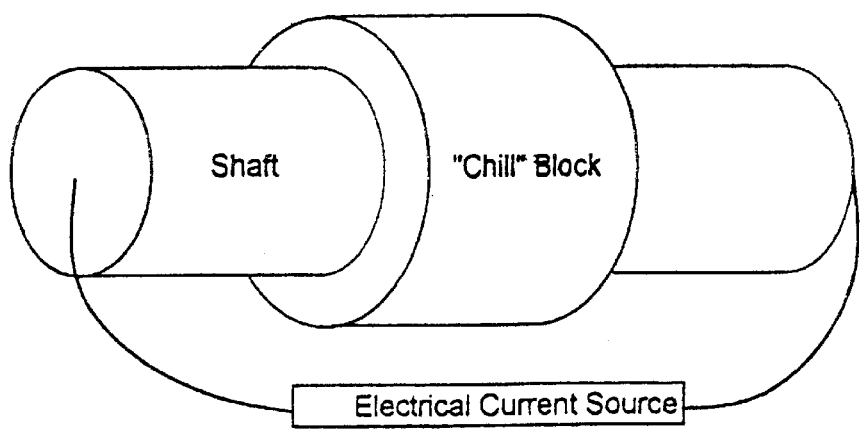
FIG. 8 illustrates one method of making the sensor of FIG. 7.

Limiting various temperature excursions to local regions requires judicious use of focused energy sources, thermal insulation and local contact with heated or cooled surfaces. These techniques may be used separately or in combination during one or more processing steps. The basic idea is illustrated by the specific example shown in FIG. 8 which illustrates a shaft heated by the passage of an electrical current. The shaft temperature in the central "chill" block area is maintained lower than in the unchilled end areas.

The size, shape and complexity of the "chill" block shown in this figure will depend on the shaft size, the required temperature gradient between the cooled and uncooled areas, and on the time that this gradient must be maintained. With small diameter shafts, or rapid thermal cycle times, a close fitting copper ring (perhaps even electroplated) might be sufficient. The high electrical conductivity of copper would reduce the ohmic heating of the enclosed shaft region. Long process times, large shafts and/or large temperature gradients might require an active heat sink, e.g., forced air cooling of a finned block, or even a water or refrigerant cooled block. It might also be desirable, in order to reduce the electrical power required as well as to maintain a more uniform and easily controlled temperature, to insulate the unchilled shaft regions with fiberglass, asbestos, or other materials having low thermal conductivities. The use of, and location of, insulation and heat sinks will obviously depend on whether it is the active or passive regions of the shaft that requires the higher temperature treatment. Besides the method illustrated in FIG. 8, many other means of selective heating (or cooling) are possible. Induction heating, radiant heating, partial immersion in heated or cooled liquids and other means of transferring energy into localized shaft regions are all potentially applicable.

Since the efficacy of plastic deformation in inducing phase transformations is temperature dependent, local regions of transformation will result simply by maintaining different portions of the shaft at different temperatures while the entire shaft is subjected to more or less uniform plastic straining. In materials which undergo strain induced phase transformations, there is a temperature (generally referred to as $M_d$) above which no strain induced transformation occurs. If the operating temperature range of the torque transducer is above the temperature at which the strained material would undergo a thermally induced phase transformation (called $M_s$), the two phases created by such thermomechanical processing will be stable. The choice of process or processes from among the various thermal, mechanical and thermomechanical means for inducing phase transformations will clearly depend on the peculiarities of each alloy system.

To be useful as a torque transducer, a candidate material must have one stable phase having adequate magnetic remanence, magnetostriction and coercivity, and another stable phase that is no more than weakly ferromagnetic with low magnetostriction (within the range of magnetic fields to which it might be exposed). Fortunately, there are a number of well known alloy systems that have such magnetically distinct, stable phases in the temperature range of interest. For example, it has been found that 18% Ni maraging steels can be thermally processed to various metallurgical conditions having vastly different magnetic and magnetoelastic properties. In general, many highly alloyed iron rich materials will be found to be thermally and/or mechanically processable to conditions having adequately distinct magnetic and magnetoelastic properties to be potentially useful for constructing one piece torque transducers. Some examples of known useful alloy systems are as follows:

1. Hadfield steel and variations thereof that rely on large additions of Mn (or some other elements or combinations of elements) to carbon steels in order to stabilize the austenitic g phase (that normally exists at high temperatures) allowing it to exist at low temperatures. Austenite is normally paramagnetic. At cryogenic temperatures some austenites are antiferromagnetic. Classical Hadfield steel consists of iron alloyed with 12% Mn, 1.2% C. Transformation of the austenite to ferromagnetic martensite is accomplished by cold working at room temperature. Surface rolling or other processes causing local deformation can be used to create an active surface region (process dependent depth) axially (and internally) contiguous with non-magnetizable passive regions. In this connection, it is interesting to note that Hadfield steel has been used for more than a century for railroad rails where the hard, wear resistant martensite resulted from the rolling action of the train wheels.

2. TRIP steels. These steels are generally warm worked (plastically deformed above the $M_d$ temperature) to create a high density of dislocations. The austrenitic structure is maintained at room temperature (and below). Any further plastic deformation below the $M_d$ temperature results in the transformation to martensite. TRIP steels are generally complex alloys, often containing more than 30% of elements other than iron. Since these elements (typically Cr, Co, Ni, Mo) generally contribute to the magnetostriction (and often lower the crystal anisotropy) these alloys are magnetoelastically active. Moreover, having been developed for such demanding service as land mine resisting tank floor plates, they are exceptionally strong.

3. Common stainless steels of the 18-8 variety (18% Cr, 8% Ni) have an austenitic crystal structure in the solution annealed condition. Depending on the exact alloy content, the crystal structure of many of the steels in this family will be converted to ferromagnetic martensite by cryogenic treatment, by cold work or by combinations of these processes. Generally those alloys having less total alloy content (e.g., AISI 302) will more readily transform into martensite than those with higher total alloy content (e.g., AISI 316). Some alloys of this kind are deliberately formulated to develop hard, wear resistant martensite by surface working. These find application in construction equipment and agricultural tools.
4. Precipitation hardened stainless steels having sufficient chromium and nickel to retain austenitic structures at room temperature can be converted to martensite by aging treatments. During aging, precipitates are formed which reduce the concentration of "austenitizing" elements.
5. Iron, nickel, carbon alloys having similar properties to Hadfield steel (although Ni is more expensive than Mn).

Figure 9:
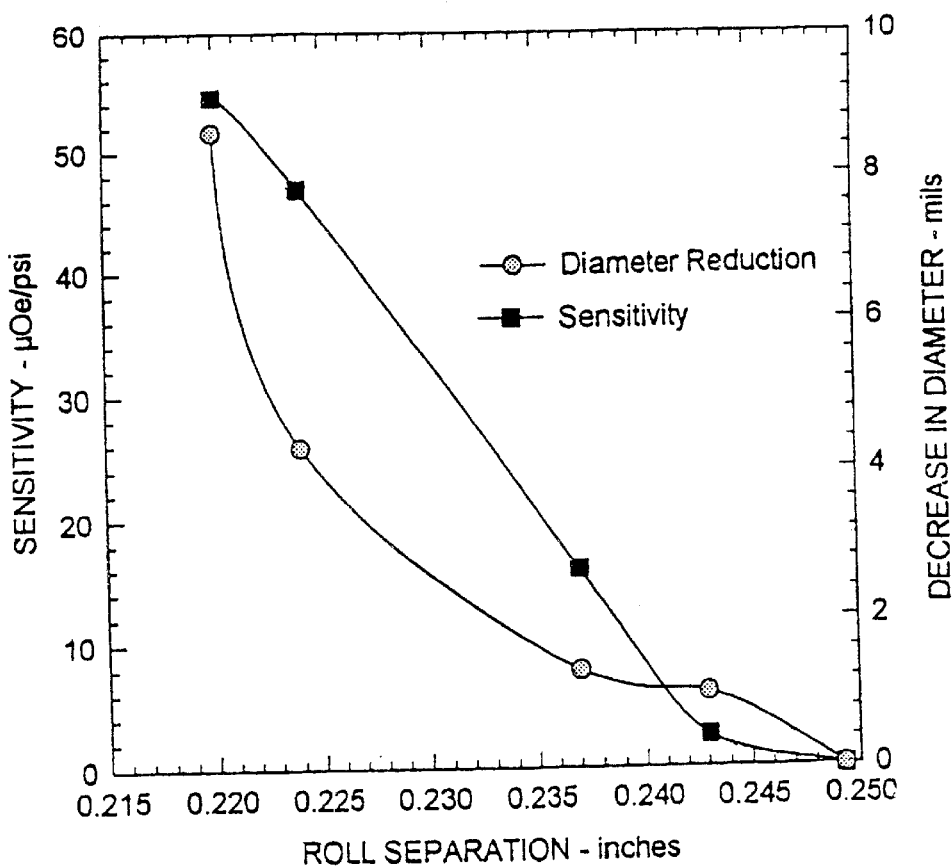
FIG. 9 is a graphical representation of the relationship between cold working roll separation and the sensitivity of the resulting sensor.
Figure 10:
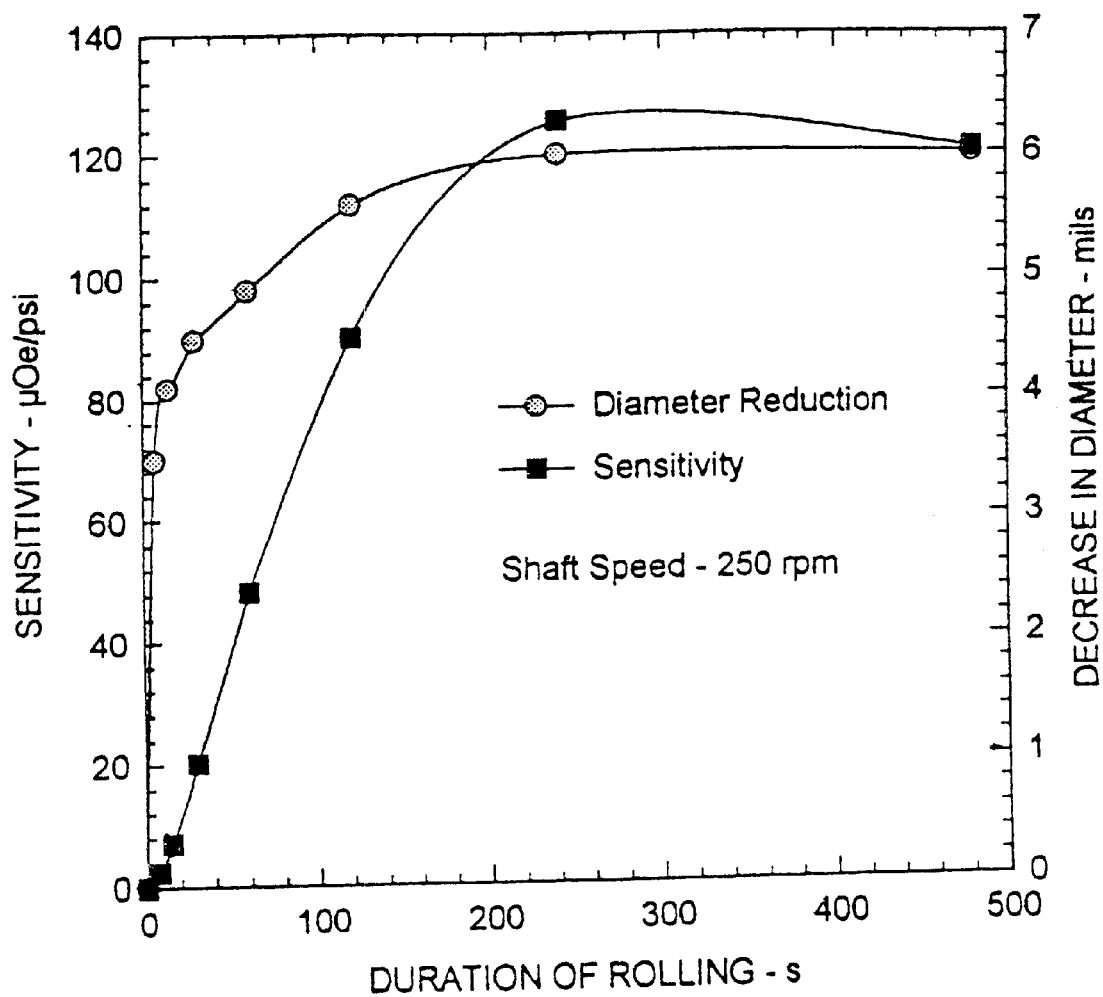
FIG. 10 is a graphical representation of the relationship between the duration of cold work rolling and the sensitivity of the resulting sensor.

To demonstrate the manufacture of a collarless torque sensor by this method, test shafts were fabricated from stainless steel seamless tubing (AISI-304 having approximately 18% chromium and 8% nickel) having a ¼" (6.35 mm) outside diameter. In the as-received annealed state, these shafts were essentially non-ferromagnetic (permeability of no more than 1.1). While rotating each shaft, it was forced between two hardened steel rollers having known roll separations for measured time durations. This treatment subjected the surface material to a periodic reverse bending stress above its yield strength. Such plastic deformation caused the austenite to convert to a ferromagnetic martensite (permeability in the range from 10 to 100). This creates the active region of the transducer. By axial movement of the shaft relative to the roller pair, an active region having an axial extent greater than the face width of the rollers can be created. Thereafter, the shafts were each circumferentially magnetized by rotation proximate to a pair of oppositely polarized magnets to create a dual region transducer. The transducer was tested by measuring the radial field emerging from the cold worked zone as torque was applied to the shaft. The test results indicate that the sensitivity increases with decreasing roll separation (the smaller the roll separation greater the amount of cold work), see FIG. 9, and with increased duration of rolling (the greater the rolling time the greater the amount of cold work), see FIG. 10. These results are not surprising since more cold work means more martensite formation.

INDUSTRIAL APPLICABILITY

In addition to all of the usual applications for torque transducers, collarless designs are especially suited for a number of application areas and specific applications where the flexibility and economy associated with its single piece construction and/or the common chemistry of the active and inactive portions of the shaft is either desirable or necessary. Some of these are described below.

1. Shafts exposed to corrosive environments.

High strength steels such as 18% Ni maraging steels are subject to stress corrosion cracking when stressed in tension and exposed to salt water, especially hot, acidified, salt water. In conventional "ring on shaft" transducers, the installed ring is often under a substantial tensile hoop stress as a result of its attachment to the shaft via an interference fit. Collarless designs have no ring, hence there are no regions of the shaft that are purposefully stressed in tension. In fact, it is not uncommon, in the interest of increasing fatigue strength, to shot peen, roll or otherwise treat the surfaces of high duty shafts in order to instill residual compressive stresses. The single chemistry of both active and inactive regions also avoids the opportunity for galvanic corrosion present when dissimilar metals in electrical contact are exposed to electrolytes.

2. Shafts carrying extreme torques.

The limiting torque of ring on shaft constructions is often determined by the onset of interfacial slip between the ring and the underlying shaft. The use of one piece, high strength steel shafts avoids the possibility of such slippage.

3. Shafts operating at high or low temperature, or temperature variation extremes.

The use of one piece shafts avoids concerns for the relaxation of contact pressure (and associated hoop stress) at very low temperatures due to differential thermal expansions (contractions) of the ring and the underlying shaft. Similarly it avoids concerns for the relaxation of contact pressure at very high temperatures due to creep (inelastic strain associated with the reduction in the yield strengths of both the shaft and the ring and the increase in interference due to differences in their thermal expansions.)

4. Shafts subject to recurrent removal or replacement. (Disposable shafts)

Torsion is often the primary loading mode on cutting tools such as drills, taps, reamers, end mills, boring bars, etc. Tools of this kind are utilized in either of two modes: rotating tool or rotating workpiece. In either case, the torque transmitted through such tools provides an indication of their condition (sharpness, integrity, etc.) as well as the relative properties of the workpiece and operating conditions (hardness, presence, presence and efficacy of coolants, lubricants, presence of flute clogging chips, etc.). Many cutting tools are fabricated from high speed tool steels, a highly satisfactory material for collarless torque transducer shafts. It is only necessary that an active region be created in some available (exposed) shank portion (between the chuck or other driving or holding means and the cutting region) and that a suitable magnetic field sensing means be appropriately mounted. A system may be envisioned in which individual tools are polarized in some ad hoc fixture prior to their being installed in the machine. Polarization may take place either immediately prior to such installation, or at some other convenient time during their manufacture, sharpening or resharpening. In applications where the tool rotates it is also possible to include polarizing magnets within the field sensing assembly, thereby allowing for the use of tools having no prior magnetic conditioning. Since chips are produced during use of these tools, some arrangements have to be made to prevent their intrusion into the sensing assembly. Ring on shaft constructions are hardly compatible with most applications of this type, being more suitable for transducers installed on the spindle (or other portion) of the machine tool. The advantage of having the torque transducer function directly on the cutting tool is that it is automatically sized for the torque range used by the actual tool rather than being sized for the largest tool that might be used on the machine.

5. "Line" shafts where torque is variable with axial location.

It is sometimes desirable to be able to measure the torque being transmitted along several portions of one shaft. Such applications exist where one shaft is used to drive a multiplicity of loads, or where the torsional load is distributed continuously along the shaft length. Examples of the former are found in packaging and textile machinery where the driving torque applied to a shaft at one location drives a number of gears, pulleys, sprockets, etc. at a number of spatially separated locations. Web and sheet producing and handling machines utilize rollers (i.e., shafts) having continuous (along their length) distributions of torque application. By readily allowing active regions to be instilled at many different locations on a single shaft, collarless design provides a ready means to monitor, equalize or otherwise control the distribution of torque along such shafts. Installing a multiplicity of rings on a single shaft is, at the least, a difficult undertaking, especially if they are all to be the same size.

6. Very small or very large shafts. Shafts with large ends. Retrofitted machinery.

Very small rings for use on very small shafts (e.g., 1 mm diameter) are difficult to handle and to install using press fits. Operation of small shafts at extreme speeds also requires precise balancing. Very large shafts (either diameter or length) require large machinery for handling and the possible use of large (and expensive) tools if the ring is to be axially installed far from the shaft ends. Flanges, bearing journals or other enlarged sections that may exist between the desired transducer location and the shaft ends make it difficult or impossible to utilize ring on shaft constructions. In-place machinery where the installation of rings (and perhaps isolating paramagnetic sleeves as well) is too elaborate, expensive and/or time consuming an undertaking may be retrofitted with a torque transducing function simply by mounting field sensors in appropriate locations and polarizing the desired region with magnets temporarily or permanently held in the required locations as the shaft rotates in its normal fashion. Ship propeller shafts, rolling mill shafts, shafts on large motors, generators, pumps and gear boxes are examples.

What is claimed is:

1. A magnetoelastic torque sensor for providing an output signal indicative of the torque applied to a member about an axially extending axis of said member, comprising:
   a first magnetostrictive, magnetoelastically active region in said member, said active region having magnetic domains magnetically polarized in a single circumferential direction and possessing sufficient magnetic anisotropy to return the magnetization in said active region to said single circumferential direction when the applied torque is reduced to zero, and possessing sufficient remanent magnetization whereby said active region produces a magnetic field varying with said torque;
   a first inactive region in said member proximate to said active region, said inactive region being sufficiently weakly magnetostrictive and having magnetic domains with substantially less remanent magnetization compared to said active region when said active region is magnetically polarized or when said active region produces the magnetic field; and
   magnetic field sensor means mounted proximate to said active region for sensing a characteristic of the magnetic field at said sensor means which is indicative of said applied torque and providing said output signal in response thereto;
   whereby the field arising from said active region does not magnetize said inactive region to give rise to parasitic magnetic fields from said inactive region which are of sufficient strength to destroy the usefulness, for torque sensing purposes, of the net magnetic field seen by said magnetic field sensor means.

2. A magnetoelastic torque sensor, as claimed in claim 1, including at least one additional axially distinct, circumferential magnetoelastically active region which is magnetically contiguous with said first active region, each additional active region having magnetic domains and being magnetostrictive and polarized in a circumferential direction opposite to the polarization direction of said first active regions and possessing sufficient magnetic anisotropy to return the magnetization in said additional active region to its single circumferential direction when the applied torque is reduced to zero.

3. A magnetoelastic torque sensor, as claimed in claim 1, wherein said member is formed of a polycrystalline material having cubic symmetry.

4. A magnetoelastic torque sensor, as claimed in claim 3, wherein said member is formed of a material selected from the group consisting of martensitic stainless steels, precipitation hardening stainless steels containing chromium and nickel, quenched and tempered alloy steels, tool steels, high nickel content maraging steels, ductile permanent magnet materials, magnet steels, Permendur, Alfer, Kovar, Hard Drawn Nickel and Hard Drawn Permalloy.

5. A magnetoelastic torque sensor, as claimed in claim 1, wherein said magnetic anisotropy is primarily microcrystalline anisotropy.

6. A magnetoelastic torque sensor, as claimed in claim 1, wherein said member is an elongated shaft having an axially extending enlarged diameter portion intermediate its ends and said magnetoelastically active region is formed on said enlarged diameter portion.

7. A magnetoelastic torque sensor, as claimed in claim 1, wherein said member is an elongated shaft having an axially extending reduced diameter portion intermediate its end portions and said magnetically active region is formed on said reduced diameter portion.

8. A magnetoelastic torque sensor, as claimed in claim 7, wherein said reduced diameter portion is a separate shaft which is rigidly attached to the larger diameter end portions.

9. A magnetoelastic torque sensor, as claimed in claim 1, wherein the coercivity of said member is greater than 15 Oe.

10. A magnetoelastic torque sensor, as claimed in claim 1, wherein the coercivity of said member is greater than 20 Oe.

11. A magnetoelastic torque sensor, as claimed in claim 1, wherein the coercivity of said member is greater than 35 Oe.

12. A magnetoelastic torque sensor, as claimed in claim 1, wherein said magnetic field sensor means comprises a solid state sensor.

13. A magnetoelastic torque sensor, as claimed in claim 1, wherein said magnetic field sensor means comprises a flux gate magnetometer.

14. A magneto elastic torque sensor, as claimed in claim 1, wherein said magnetic field sensor means is mounted and oriented with respect to said magnetostrictive, magnetoelastically active region to sense the magnitude and polarity of said magnetic field.

15. A magnetoelastic torque sensor, as claimed in claim 14, wherein said sensor means is positioned proximate an end of said region.

16. A magnetoelastic torque sensor, as claimed in claim 14, wherein said sensor means comprises at least two sensors, at least one sensor being positioned proximate each end of said region.

17. A magnetoelastic torque sensor, as claimed in claim 1, wherein said magnetoelastically active region has, in the absence of torque applied to said member, a circumferential magnetic orientation having no net magnetization component in the axial direction.

18. A magnetoelastic torque sensor, as claimed in claim 17, wherein said magnetoelastically active region has, when torque is applied to said member, a helical magnetic orientation having both circumferential and axial components, said magnetic field sensor means being positioned and oriented for sensing the magnetic field arising from said axial components of magnetization.

19. A method of sensing a torque applied to a torqued member extending in an axial direction, comprising the steps of:
   (a) providing a first magnetostrictive, magnetoelastically active region in said member, said active region having magnetic domains magnetically polarized in a single circumferential direction and possessing sufficient magnetic anisotropy to return the magnetization in said active region to said single circumferential direction when the applied torque is reduced to zero;

(b) providing a first inactive region in said member proximate to said active region, said inactive region being sufficiently weakly magnetostrictive and having magnetic domains with substantially less remanent magnetization compared to said active region when said active region is magnetically polarized or when said active region produces a magnetic field; whereby the field arising from said active region does not magnetize said inactive region to give rise to parasitic magnetic fields from said inactive region which are of sufficient strength to destroy the usefulness, for torque sensing purposes, of the net magnetic field seen by a magnetic field sensing means;

(c) producing a magnetic field as a consequence of the application of torque to said member; and (d) sensing a characteristic of the magnetic field at a position proximate to said active region which is indicative of the torque applied to said member.

20. A method, as claimed in claim 19, wherein the application of torque to said member causes said magnetoelastically active region to have a helical magnetic orientation with both circumferential and axial magnetization components and said sensing step comprises sensing the magnetic field arising from said axial components of said magnetization.

21. A method, as claimed in claim 19, including the step of providing at least one additional axially distinct, circumferential magnetoelastically active region which is magnetically contiguous with said first region, each additional region being ferromagnetic and magnetostrictive, polarized in a circumferential direction which is opposite from the polarization direction of magnetically contiguous magnetoelastically active regions and possessing sufficient magnetic anisotropy to return the magnetization in said additional region to its single circumferential direction when the applied torque is reduced to zero.

22. A method, as claimed in claim 19, including the step of providing at least one additional axially distinct, circumferential magnetostrictive, magnetoelastically active region which is magnetically contiguous with said first active region, each additional active region having magnetic domains and being polarized in a circumferential direction which is opposite from the polarization direction of magnetically contiguous magnetoelastically active regions and possessing sufficient magnetic anisotropy to return the magnetization in said additional active region to its single circumferential direction when the applied torque is reduced to zero.

23. A method, as claimed in claim 19, wherein the coercivity of said member is greater than 15.

24. A method of producing a magnetoelastic torque transducer from a member to which an axial torque is applied for producing a magnetic field varying with said torque, the magnitude of said magnetic field being sensed by magnetic field sensors for providing an output signal indicative of the applied torque, comprising the steps of:

(a) providing a magnetostrictive member having a first magnetostrictive, magnetoelastically active region in said member;

(b) providing a first inactive region in said member proximate to said first active region, said inactive region being sufficiently weakly magnetostrictive and having magnetic domains with substantially less remanent magnetization compared to said active region when said active region is magnetically polarized or when said active region produces a magnetic field;

(c) polarizing a finite axial extent of said active region in a magnetizing field in a single circumferential direction, said active region possessing sufficient magnetic anisotropy to return the magnetization in said region to said single circumferential direction when the applied torque is reduced to zero and possessing sufficient remanent magnetization; and (d) whereby the field arising from said first active region does not magnetize said inactive region to give rise to parasitic magnetic fields from said inactive region which are of sufficient strength to destroy the usefulness, for torque sensing purposes, of the net magnetic field seen by said magnetic field sensors.

25. A method, as claimed in claim 24, wherein said member has a longitudinal axis and said magnetic polarization is achieved by rotating said transducer thereabout while being subjected to the magnetizing field near two opposite magnetic poles.

* * * * *